US007137162B2

(12) United States Patent
Spencer et al.

(10) Patent No.: US 7,137,162 B2
(45) Date of Patent: Nov. 21, 2006

(54) IMAGING SYSTEM FOR A PASSENGER BRIDGE OR THE LIKE FOR DOCKING AUTOMATICALLY WITH AN AIRCRAFT

(75) Inventors: Derwin C. Spencer, Rockwood (CA); Ohad I. Unna, Mississauga (CA)

(73) Assignee: Indal Technologies Inc., Mississauga (CA)

( * ) Notice: Subject to any disclaimer, the term of this patent is extended or adjusted under 35 U.S.C. 154(b) by 191 days.

(21) Appl. No.: 10/505,092

(22) PCT Filed: Feb. 26, 2003

(86) PCT No.: PCT/CA03/00268

§ 371 (c)(1),
(2), (4) Date: Aug. 19, 2004

(87) PCT Pub. No.: WO03/072435

PCT Pub. Date: Sep. 4, 2003

(65) Prior Publication Data

US 2005/0198750 A1 Sep. 15, 2005

(30) Foreign Application Priority Data

Feb. 27, 2002 (CA) .................................... 2373669

(51) Int. Cl.
*E01D 15/10* (2006.01)
*E01D 15/127* (2006.01)

(52) U.S. Cl. ........................................ 14/71.5; 14/69.5
(58) Field of Classification Search ................. 14/71.5, 14/69.5
See application file for complete search history.

(56) References Cited

U.S. PATENT DOCUMENTS 3,642,036 A   2/1972   Ginsburgh et al. ............ 141/94

(Continued)

FOREIGN PATENT DOCUMENTS

EP   0 463 457   6/1991

(Continued)

*Primary Examiner*—Raymond Addie
(74) *Attorney, Agent, or Firm*—Neil H. Hughes; Ivor M. Hughes; Marcelo K. Sarkis

(57) ABSTRACT

A method of identifying the position of an opening, for example a door or a cargo bay, or the like of an aircraft, said opening having a predetermined perimeter, said method comprising: i) providing at least one passive target means (10, 11) proximate the perimeter of said opening and preferably being disposed proximate the perimeter of said opening, and when said opening is a door proximate the four corners of said door, and in another embodiment said target means is provided as a cluster of targets for example, at least one target located proximate each corner of said door; ii) directing a preferably pulsing lighting means (30) on said target (10, 11), preferably a passive reflective target such as that manufactured by the 3M company under the trademark Scotchlite® in one embodiment being in the invisible spectrum such as infrared or the like; iii) providing a target identification means and preferably at least one camera (20) and preferably a digital camera synchronized with said lighting means (30) and preferably housed together with said light to provide raw data, preferably images to a computing means; iv) computing means for receiving information from said target identification means and preferably at least one camera to process said information (in one embodiment provide enhanced images) and compare it to information stored in the computing means and thereby determine further action which might be taken based on the identification of the position opening.

24 Claims, 28 Drawing Sheets

U.S. PATENT DOCUMENTS

| | | |
|---|---|---|
| 3,683,440 A | 8/1972 | Xenakis et al. ................ 14/71 |
| 3,765,692 A | 10/1973 | Barber et al. ................ 280/6 |
| 3,883,918 A | 5/1975 | Magill ............................ 14/71 |
| 3,917,196 A | 11/1975 | Pond et al. .................... 244/77 |
| 3,983,590 A | 10/1976 | Anderberg .................. 14/69.5 |
| 4,748,571 A | 5/1988 | Shippy ........................ 364/513 |
| 4,834,531 A | 5/1989 | Ward .............................. 356/5 |
| 4,942,538 A | 7/1990 | Yuan et al. ................. 364/513 |
| 5,105,495 A | 4/1992 | Larson et al. ............... 14/71.5 |
| 5,109,345 A | 4/1992 | Dabney et al. ............. 364/459 |
| 5,226,204 A | 7/1993 | Schoenberger et al. ...... 14/71.5 |
| 5,552,983 A | 9/1996 | Thornberg et al. ..... 364/424.01 |
| 5,734,736 A | 3/1998 | Palmer et al. ............... 382/103 |
| 5,761,757 A | 6/1998 | Mitchell et al. ............. 14/71.5 |
| 5,791,003 A | 8/1998 | Streeter et al. .............. 14/71.5 |
| 5,855,035 A | 1/1999 | Streeter et al. .............. 14/71.5 |
| 5,950,266 A | 9/1999 | Streeter et al. .............. 14/69.5 |
| 6,024,137 A | 2/2000 | Strnad et al. .................. 141/1 |
| 6,195,826 B1 | 3/2001 | LeBaron et al. ............. 14/71.5 |
| 6,330,726 B1 | 12/2001 | Hone et al. .................. 14/71.5 |
| 6,684,443 B1 * | 2/2004 | Thomas et al. ............. 14/71.5 |
| 7,030,354 B1 * | 4/2006 | Oki et al. ................ 250/206.2 |

FOREIGN PATENT DOCUMENTS

| | | | |
|---|---|---|---|
| EP | 0 781 225 | 9/1995 | |
| EP | 0 865 923 | 3/1998 | |
| FR | 2 573 724 | 11/1984 | |
| JP | 2002/015279 | * 2/2002 | ................ 14/71.5 |
| WO | WO 0134467 | 5/2001 | |

* cited by examiner

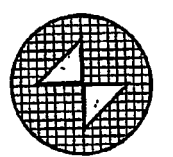
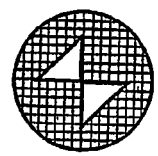
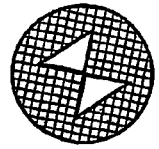
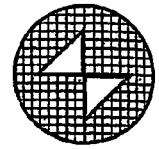
FIGURE 3D

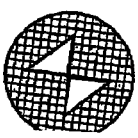
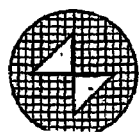
FIGURE 3E

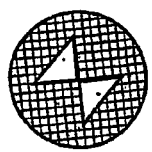 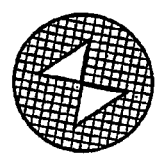
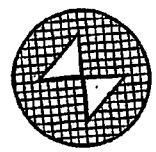 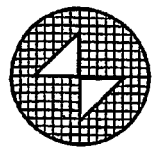
FIGURE 3F

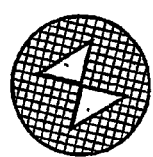 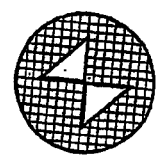
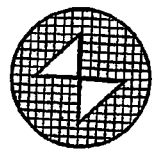 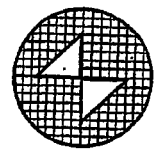
FIGURE 3G

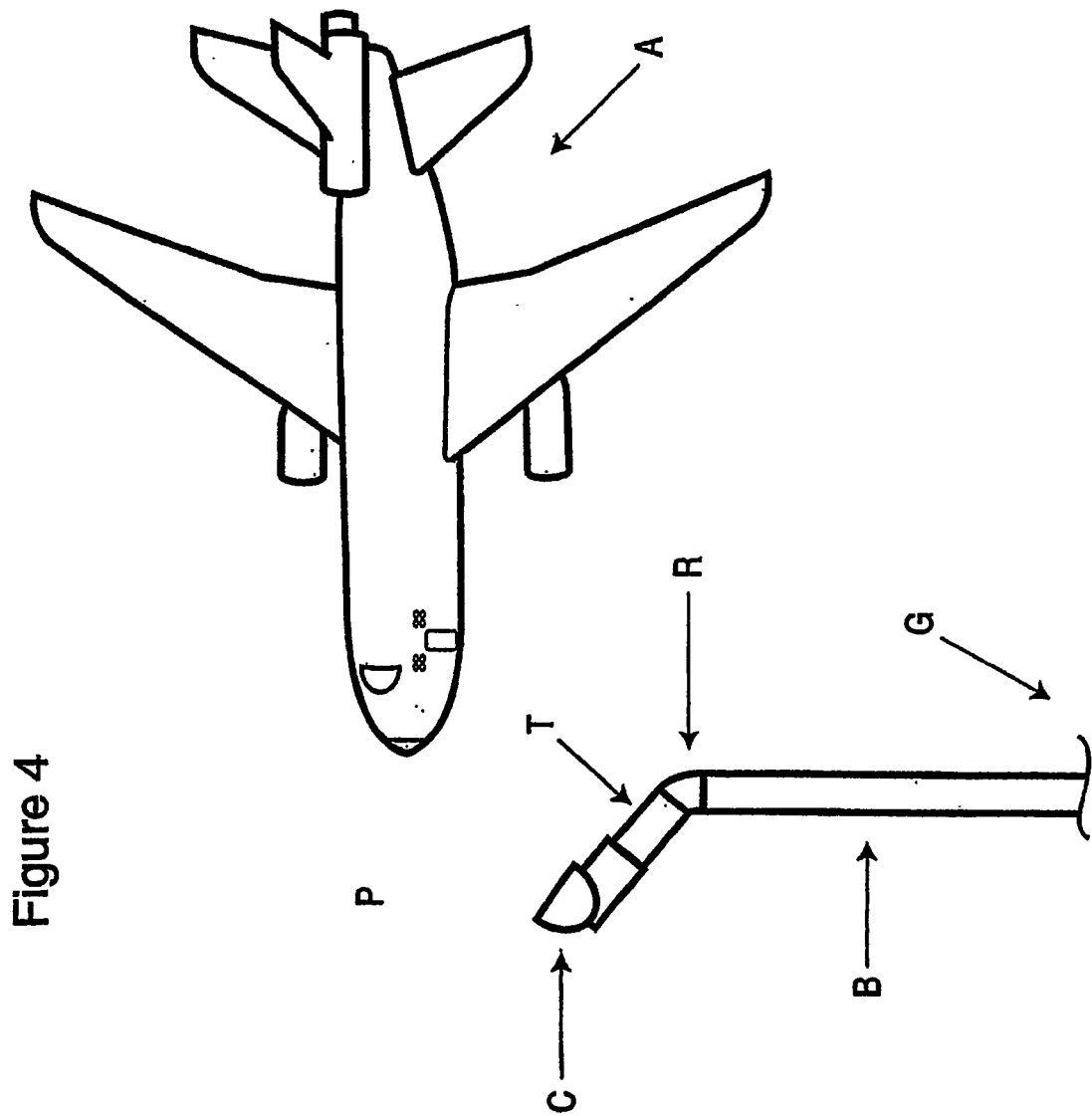

Figure 19
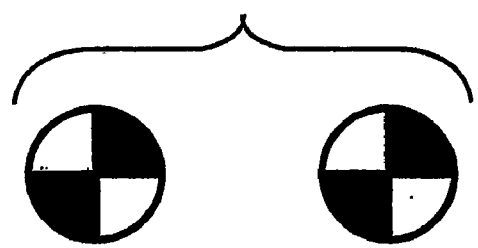
Figure 20
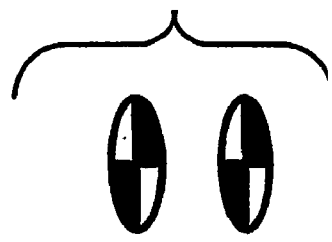
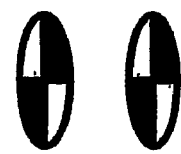
Figure 21
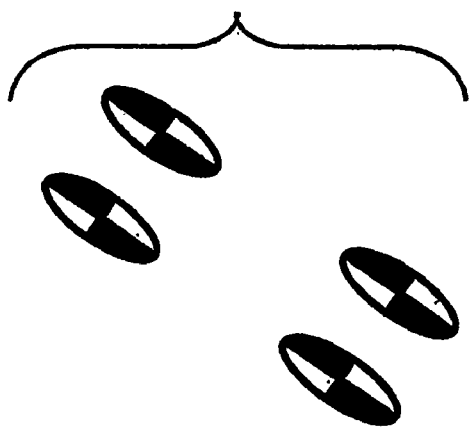
Figure 22
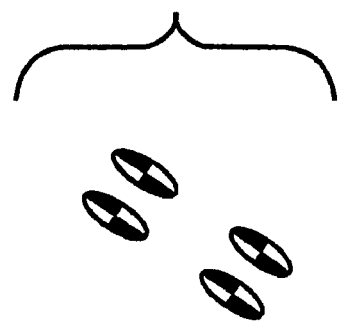

IMAGING SYSTEM FOR A PASSENGER BRIDGE OR THE LIKE FOR DOCKING AUTOMATICALLY WITH AN AIRCRAFT

BACKGROUND OF THE INVENTION

Modern airports are equipped with passenger bridges located adjacent to numerous gates on which passengers may walk safely protected from the weather between the terminal building gate and the aircraft.

A known mobile-type passenger bridge includes a rotunda that is connected to a terminal building. The bridge is rotatably mounted on a column anchored in the ground. A passageway extends from the rotunda, which is made up of a number of telescoping inter-fitting tunnel like elements, enabling variation of the length of the passageway. At the end of the passageway located farthest away from the rotunda, there is provided a cabin which is pivotable in relation to the passageway so as to align with the doorway of the aircraft. The passageway element to which the cabin is attached is suspended from a vertically adjustable frame, which in turn is supported by a bogie with wheels that can be driven separately.

The passenger bridge normally occupies a parked position in the vicinity of the place where the aircraft is to come to a halt after landing. When the aircraft has come to halt, an operator controls the passenger bridge vertically, angularly, and telescopically extends the passageway in the direction of the aircraft, and finally pivots the cabin such that the end of the bridge is connected to the door of the aircraft. The operation in the horizontal plane is achieved by altering the speeds of the bogie wheels in the relation to one another.

Current Docking Procedures

When the aircraft arrives the Ground Traffic Control (GTC) hands off the aircraft to the Ramp or Apron Control (AC), once the aircraft leaves the taxiway for the terminal gate. The AC instructs the pilot to proceed to a specific gate when the pilot communications switches from GTC to AC. The AC instructs ramp crew to be positioned to receive the aircraft. The Ramp crew must have at least one marshaller, who may activate the visual docking system or operate the paddles. The aircraft may travel to its docking position by means of one engine or two.

When the aircraft stops, the marshaller (who may also be the AC) will plug into the aircraft for communication with the pilot. The passenger bridge operator (which on occasion could be the marshaller) will then drive the passenger bridge (PB) to the aircraft door. The marshaller will then connect the ground power from the PB to the aircraft, APU. Due to the length of the cable on the cable reel, the PB must be against the aircraft in order to connect the APU. The aircraft door is then opened by the PB operator (for some airlines), or the aircraft crew for other airlines.

Departure

Approximately five minutes before "push back", the marshaller will disconnect the ground power from the aircraft APU. Once the aircraft door is closed, the PB can be retracted but the PB operator must remain at the PB controls in case of an emergency evacuation. In practice, if there is a delay, the PB operator sometimes leaves to go operate a PB at another gate. This creates a problem because the PB operator may not be available if the delay is suddenly eliminated and the pilot is ready for "push back". Generally, there will be the ramp lead (connected to the aircraft for communications with the pilot), a tow tractor driver, and possibly one walker to watch for obstructions during "push back" involved in this operation.

Owing to its complexity, this operation requires operators with special training, which of course is expensive for the airlines. Furthermore, it takes a long time to perform the connection. Also, it happens that the bridges bump into the aircraft as a result of error on the part of the operator, thus damaging the aircraft. Therefore the passenger bridge at airline terminals can be a cause of delay to arriving and departing aircraft, because it is necessary to have a qualified operator move the passenger bridge. There are a limited number of qualified operators and during busy times they are in short supply and thus there may not be one available when the aircraft arrives at the gate or is ready to depart from the gate consequently the aircraft will be delayed until the operator arrives.

Applicants are aware of the following patent literature with respect to the abovementioned subject matter:

U.S. Pat. No. 3,683,440 teaches an apparatus for aligning one or more motorized terminal bridges to one or more doors in a vehicle enabling the loading and unloading of passengers and freight. The subject patent provides control of drive signals used to align the cab of a terminal bridge with a door in parked vehicle. It includes positional transducers which are coupled to various movable sections of the bridge including the rotatable end of the bridge attached to the terminal, the expandable length passageway, the rotatable cab and the variable height hydraulic cylinders connecting the truck which supports the bridge to the passageway. These transducers produce voltages indicative of the spatial position of the bridge as determined by the orientation of the various movable sections. A television camera mounted in the cab enables an operator stationed at a remotely located control panel to view the area around the bridge of a television monitor. The cab can be rotated from the control panel as the operator views the monitor. Control circuits located in an electronics unit under the cab respond to signals from the control panel to produce initial positioning signals that rotate the bridge away from the terminal, extend the passageway, and align an electro-optical device to reflective type material affixed to the aircraft in the vicinity of the door. Positional voltages provided by the transducers and electro-optical device are processed in logic circuits disposed in the electronics unit that function in a prescribed manner to produce drive signals. These drive signals guide the bridge along a path that will bring the cab into alignment with the door. As the cab approaches the door, the speed is automatically decreased until the cab contacts the vehicle. Pressure switches mounted around the perimeter of the cab opening contact the vehicle producing control signals which rotate the cab and provide forward drive motion until complete contact of the cab opening and the vehicle is attained. A park indicator signal is then applied to the remotely located control panel and all power is turned off except that used in the control circuitry connected to the hydraulic cylinders. The electro-optical device mounted in the cab senses the height of the vehicle. If the vehicle height varies during loading or unloading, these switches provide signals to the control circuitry which will produce drive signals to the hydraulic cylinders thereby maintaining the cab at the same level as the door. The bridge is automatically retracted from the vehicle in response to a control signal from the control panel and returned to its original position prior to activation. It is clear that the operation of this system is operator dependent in spite of the semi-automatic computer assisted aspects included. All of the drawbacks in the prior art identified above have therefore not been addressed.

U.S. Pat. No. 4,942,538 teaches a tele-robotic system adapted for tracking and handling a moving object comprising a robot manipulator, a video monitor, an image processor, hand controls and a computer.

U.S. Pat. No. 5,226,204 teaches a tele-robotic control apparatus for aligning the movable end of a motorized passenger loading bridge to the door in a vehicle enabling the loading and unloading of passengers and freight.

U.S. Pat. No. 6,330,726 teaches a bridge for the transfer of passengers between an elevated level of a terminal building having a vestibule attached to the terminal building.

European Patent 0781225 teaches a method of connecting one end of a passenger bridge (1) or a goods-handling device of mobile type to a door on an aircraft. The system requires that the aircraft type be identified in order for the correct windshield configuration to be provided.

U.S. Pat. No. 3,642,036 teaches a system for automatically fueling an automotive vehicle, comprising a movable fuel dispenser including a nozzle which is adapted to be coupled to the fuel inlet of the vehicle, and programmable moving means connected to the fuel dispenser to move same into a position where the nozzle can be coupled with the fuel inlet.

U.S. Pat. No. 3,917,196 teaches an apparatus for use in orienting aircraft flight for refueling or other purposes.

U.S. Pat. No. 6,024,137 teaches an automatic fueling system including a pump having a telescoping arm capable of placement in three-dimensional space; a flexibly mounted nozzle on the end of the arm and a docking cone to mate with a fuel port on a vehicle. A camera provides a view of the side of the vehicle on a monitor with guides visible to the operator of the vehicle to assist in locating the vehicle within range of the pump. A light and a camera located adjacent to the nozzle are used to recognize retro-reflective light from an annular target about the intake port.

U.S. Pat. No. 4,834,531 teaches a dead reckoning opto-electronic intelligent docking system.

U.S. Pat. No. 5,109,345 teaches an autonomous docking system which produces commands for the steering and a propulsion system for a chase vehicle used in the docking of that chase vehicle with a target vehicle.

U.S. Pat. No. 5,734,736 teaches an autonomous rendezvous and docking system and method therefore.

U.S. Pat. No. 3,765,692 teaches an apparatus for automatically adjusting the floor of a moving vehicle to the height of a loading dock or platform.

U.S. Pat. No. 4,748,571 teaches a line-up vision system for testing the alignment of a workpiece in a holder of an automated machining apparatus.

U.S. Pat. No. 3,983,590 teaches a safety device for a loading bridge or walkway, at which aircraft are parked, for loading and unloading of passengers and cargo through an open door in the aircraft.

U.S. Pat. No. 5,105,495 teaches an array of non-contact proximity sensors mounted on the front bumper of a loading bridge to be in opposition to the airplane.

U.S. Pat. No. 5,552,983 teaches a variable referenced control system for remotely operated vehicles.

U.S. Pat. No. 5,791,003 teaches a method and apparatus for variably elevating a passenger boarding bridge platform.

U.S. Pat. No. 5,855,035 teaches a method and apparatus for reducing skidding of wheels on a passenger boarding bridge.

U.S. Pat. No. 5,950,266 teaches a method and apparatus for connecting a passenger boarding bridge to a movable body.

U.S. Pat. No. 6,195,826 teaches an engagement structure adapted for securement to the end of an aircraft boarding bridge including a bumper assembly formed of a first bumper and an auxiliary bumper.

U.S. Pat. No. 3,883,918 teaches a telescopic connection for the proximate end of an airport passenger bridge.

U.S. Pat. No. 5,761,757 teaches a passenger boarding bridge for servicing a commuter aircraft.

An object of this invention is, therefore, to address some of the problems in the art.

It is therefore a primary object of this invention to provide an imaging system adapted for a vehicle to be docked with an aircraft opening.

It is yet a further object of this invention to provide such a system which is self initiating without the need of an operator.

It is a further object of this invention to automate the controls of a passenger ridge using a camera based imaging system to sense the aircraft position and rive the bridge to the appropriate door opening location.

Further and other objects of the invention will become apparent to those skilled in the art when considering the following summary of the invention and the more detailed description of the preferred embodiments illustrated herein.

SUMMARY OF THE INVENTION

According to a primary aspect of the invention there is provided an automatic imaging system for, preferably initiating, the controlling, positioning and docking of a vehicle (for example a cargo loader, service vehicle, and passenger bridge) with the opening of an aircraft without being informed of the aircraft type, said vehicle having driver means to move and raise/lower said vehicle, said system comprising a duster of definitive, preferably retro-reflective, targets located adjacent the opening of the aircraft in a recognizable manner, for example as manufactured by the 3M Company, preferably Scotchlite®.

lighting means to focus on said targets when the aircraft is located at least adjacent to an expected position, preferably pulsating lighting means a camera, preferably at least one digital camera, disposed substantially adjacent said lighting means and with a field of view directed parallel to light emanating from said lighting means so as to capture any reflected images of said target and to generate images to communicate to a computer, and having a field of view including said opening of the aircraft to cooperate with and preferably be synchronized with the preferably pulsating lighting means;

a computer disposed with said vehicle to process said images received from said camera and to provide actuating signals to said driver means of said vehicles, software resident in said computer to provide an instruction set to said computer as to how to process said image information and what actions to commence in view of the information, wherein said imaging system automatically scans the area whereat said vehicle is expected and, once the targets are acquired as verified by the computer, preferably initiates and controls the positioning and docking of the vehicle with the aircraft opening while maintaining constant observation of said targets.

Preferably said vehicle is selected from the group of equipment of
  i) cargo hauling equipment;
  ii) passenger facilities equipment; and
  iii) a passenger boarding bridge;
    or the like.

According to another aspect of the invention there is provided an imaging system for identifying the location of an aircraft opening or door and for docking a vehicle (for example, passenger, cargo, service or the like) with said aircraft said system comprising:

i) a passive target means, preferably at least one target and more preferably a cluster of targets located preferably at the extremities of the opening or door, (preferably said target means being a retro-reflective type, for example as manufactured by the 3M product Scotchlite®;

ii) a target identification means including at least one camera having a field of view including said opening or door of the aircraft to cooperate with and preferably be synchronized with preferably pulsating lighting means;

iii) preferably pulsating lighting means synchronized with said target identification means, preferably stroboscopic, for lighting said target means and providing for identification thereof by computer means in communication with said target identification means;

iv) computer means to process information (preferably at least one image processed to an enhanced image) from the target identification means and to compare the processed information (preferred enhanced image) to an image retained in the memory of said computer means;

v) software means resident in said computer means to provide the instructions set and logic for said system to compare processed information including the enhanced image with stored information, (preferably images) and to thereby determine the relevant orientation, distance, and trajectories of the vehicle to be automatically docked with said aircraft based on the system's determination only;

vi) preferably said vehicle is selected from the group of equipment of:
i) cargo hauling equipment;
ii) passenger facilities equipment; and
iii) a passenger boarding bridge; or the like.

According to yet another aspect of the invention there is provided an automatic computerized passenger boarding bridge control system, said bridge having passenger bridge locomotion means to allow the bridge to move in relation to the aircraft, said system for use in conjunction with departing/arriving aircraft at an airport and comprising:

i) passive target means for identifying an exit/entrance doorway irrespective of each aircraft type;

ii) target identification means, preferably at least one camera, to identify when the aircraft containing the target means is proximate a parking location adjacent a predetermined gate for the passenger boarding bridge;

iii) position detection means for determining the physical location of the passenger boarding bridge, including the angle of the wheels relative to the telescopic tunnel, angle of the vestibule relative to the tunnel, and the radius of curvature based upon gallery extension relative to the pivot point on the terminal, to permit the computer to calculate the trajectory of the passenger loading bridge and then instruct locomotion means over the required path;

iv) computing means in communication with said target identification means, said position detection means, and said passenger bridge locomotion means, to activate said locomotion means and to provide instruction to said bridge as to when and how to move based on input from said target identification means, and said position detection means, to receive and process all input system signals and provide output system signals to said passenger bridge locomotion means, to stop, move (preferably elevate or lower, pause, or preferably steer in a predetermined direction), to turn on and synchronize the cameras and lights as necessary; and initiate any warning lights, buzzer, horn or audible signals;

v) preferably an obstacle recognition means, for example the device commonly known as "safety hoop", to inform said computing means that an obstacle is present preventing further motion of said bridge and indicating the need for action by personnel to remove said obstacle;

vi) lighting means to light said aircraft and to light the target means when the aircraft is proximate the parked location for the aircraft;

vii) software means resident in said computing means to provide the instruction set and logic required to operate said system, to compare processed information including the enhanced image with stored information, (preferably images) and to thereby determine the relevant orientation, distance, and trajectories of the vehicle to be automatically docked with said aircraft based on the system's determination only;

wherein said system allows for the movement of a passenger boarding bridge during the departure and/or arrival of an aircraft without need for an operator thereof.

According to yet another aspect of the invention there is provided a computerized automatic passenger boarding bridge control system, said bridge having a passenger bridge locomotor to allow the bridge to move in relation to the aircraft, said system for use in conjunction with departing/arriving aircraft at an airport and comprising:

i) at least one passive target for identifying an exit/entrance doorway irrespective of each aircraft type;

ii) at least one camera, to identify when the aircraft containing the at least one target is proximate a parking location adjacent a predetermined gate for the passenger boarding bridge;

iii) a position detector for determining the physical location of the passenger boarding bridge, including the angle of the wheels relative to the telescopic tunnel, angle of the vestibule relative to the tunnel, and the radius of curvature based upon gallery extension relative to the pivot point on the terminal, to permit the computer to calculate the trajectory of the passenger loading bridge and then instruct locomotor over the required path;

iv) a computer in communication with said target identifier, said position detector, and said passenger bridge locomotor, to activate said locomotor and to provide instruction to said bridge as to when and how to move based on input from said target identifier, and said position detector, to receive and process all input system signals and provide output system signals to said passenger bridge locomotor, to stop, move (preferably elevate or lower, pause, or preferably steer in a predetermined direction), to turn on and synchronize the cameras and lights as necessary; and initiate any warning lights, buzzer, horn or audible signals;

v) preferably an obstacle recognizer to inform said computer that an obstacle is present preventing further motion of said bridge and indicating the need for action by personnel to remove said obstacle;

vi) lighting to light said aircraft and to light the at least one target when the aircraft is proximate the parked location for the aircraft;

vii) software resident in said computer to provide the instruction set and logic required to operate said system, to compare processed information including the enhanced image with stored information, (preferably images) and to thereby determine the relevant orientation, distance, and trajectories of service equipment to be automatically docked with said aircraft based on the system's determination only;

wherein said system allows for the movement of a passenger boarding bridge during the departure and/or arrival of an aircraft without need for an operator thereof.

Preferably the target identification means or target identifier of the abovementioned system is a at least one digital camera. Further the at least one target and the target means is made from retro-reflective material, for example as manufactured by the 3M Company, preferably Scotchlite®.

According to yet another aspect of the invention there is provided a method of identifying the position of an opening, for example a door or a cargo bay, or the like of an aircraft, said opening having a predetermined perimeter; said method comprising:

i) providing at least one passive target means (preferably a passive reflective target such as that manufactured by the 3M company under the trademark Scotchlite®) proximate the perimeter of said opening and preferably when said opening is a door proximate the corners of said door, and in another embodiment said target means is provided as a cluster of targets proximate each corner of said door;

ii) focusing a preferably pulsing lighting means on said target, in one embodiment being in the invisible spectrum such as infrared or the like;

iii) providing a target identification means and preferably at least one camera and preferably a digital camera synchronized with said lighting means and preferably housed together with said light to provide raw data, preferably images to a computing means;

v) computing means for receiving information from said target identification means and preferably at least one camera to process said information (in one embodiment provide enhanced images) and compare it to information stored in the computing means and thereby determine further action which might be taken based on the identification of the position opening. Preferably said opening is selected from the group of openings including a passenger door, a cargo door, or the like, and preferably the opening is in the body of an aircraft. In one embodiment a passenger bridge, or cargo handling equipment is controlled by said computing means based on identification of said target means, allowing for the docking of said passenger bridge or cargo handling equipment with said aircraft and the separation thereof when the aircraft is being loaded and unloaded prior to the departure or arrival of the aircraft at a parked location.

According to yet another aspect of the invention there is provided a method of identifying both the position of an opening, for example a door or a cargo bay, or the like, of an aircraft, and the type of said aircraft, while it is moving towards said passenger boarding bridge or parked at the gate, said method comprising:

i) providing at least one passive target means proximate the perimeter of said opening, where the shape of said target means, or the number of individual targets in the cluster, or the relative position of individual targets in the duster, uniquely identifies the type of aircraft, for example using a machine readable pattern of reflective tape, wherein the type of aircraft is enclosed in said pattern machine recognizable code;

ii) focusing a preferably pulsing lighting means on said target, in one embodiment being in the invisible spectrum such as infrared or the like;

iii) providing a target identification means and preferably at least one camera and preferably a digital camera synchronized with said lighting means and preferably housed together with said light to provide raw data, preferably images to a computing means;

iv) computer means for receiving information from said target identification means and preferably at least one camera to process said information (in one embodiment providing enhanced images) and compare it to information stored in the computing means based on the identification of the position opening and of the aircraft type; preferably said opening is selected from the group of openings including a passenger door, a cargo door, or the like, and preferably the opening is in the body of an aircraft; in one embodiment the locomotion of a passenger bridge is governed by restrictions imposed due to the aircraft type, for example when one of the engines of the aircraft is in such proximity to said opening as to necessitate maneuvering the passenger bridge around it or in such a way as to prevent impacting said engine or allowing the passenger bridge to be damaged by impact, heat radiation, exhaust fumes, or other such hazards; in another example, in one or more specific aircraft types, sensitive parts of the aircraft, for example the leading edge of a wing, or an airspeed sensor, are located at such a proximity to said opening as to force the passenger bridge to take a different route or to contact the aircraft in such a way as not to damage the sensitive part or parts of the aircraft, in such an embodiment, the computing means, having received information about the aircraft type from the camera, once said camera has identified the specific aircraft type encoded within the target means, directs the locomotion of the passenger bridge in such a way as is appropriate for the specific aircraft type being approached.

In a preferred embodiment said at least one camera embodied with any of the abovementioned systems or methods may further comprise at least one primary camera and at least one broad-view camera. In another embodiment of the invention said at least one camera may further comprise a zoom lens. For example said at least one primary camera or said at least one broad-view camera may further comprise a zoom lens. In another embodiment said at least one camera may further comprise a pan- or pan-and-tilt mount.

The present invention provides automated initiation or semi-automated initiation for computerized control of a passenger personnel bridge, or alternatively a cargo handling vehicle, to align the cab of the bridge with a door in a parked aircraft. A cluster of retro-reflective targets is strategically placed adjacent the door so as to be recognized by the computer. A manual override is also provided for all functions as required.

The automatic function provides for the continuous monitoring and operation of the gate area in standby mode until an arriving aircraft is sensed, which alerts the system until the aircraft has substantially parked at which point the computer initiates the docking procedure or a qualified individual does so, for example the marshaller, after which initiation the entire system is automated. The bridge includes positional sensors and drive actuators coupled to the various movable sections of the bridge including the rotatable fixed pivoting end of the bridge attached to the terminal, the expandable length passageway, the rotatable cab with sensors indicating successful docking, and the variable height hydraulic cylinders connecting the truck which supports the bridge to the passageway. These positional sensors produce signals to communicate with the computer indicative of the position of the bridge in relation to the position of the parked aircraft as determined by the orientation of the various movable sections. A digital camera (CCD) and a light (laser) may be mounted separately on the same side of the cab portion of the bridge, or preferably together in a single housing on the cab portion of the bridge, to both illuminate the targets and capture images; and to provide these raw images to the computer, also installed on the cab portion of the bridge. The digital images of the passive definitive retro-reflective targets positioned adjacent an opening of an aircraft are processed by the computer by known methods as will be described hereinafter. These targets are readily distinguished from other images by their definitive nature. They may be positioned in clusters of two or more targets for improved accuracy.

Upon initiation of the system, the computer will pulse a narrow cone of light synchronized with the camera shutter to view the general area where the aircraft is parked and observe the targets. Based on the view of the targets as seen in the Figures the computer will determine and actuate the necessary steps to align the bridge with the aircraft opening, as the bridge is rotated about the rotunda away from the stowed position adjacent the gate while the computer continues to keep constant view of the targets, and following the extension of the tunnel, the cab can be rotated until in most cases the camera/light are substantially normal to the opening in the aircraft. The computer mounted on the cab of the bridge responds to information provided by the images being processed and other sensors provided to produce signals that rotate the bridge away from the terminal, extend the passageway, and align the cab with the targets. The images are processed by the computer based on software based algorithms to produce drive signals based on the computers understanding of the position of the cab relative to the opening. These drive signals guide the bridge along a path that will bring the cab into alignment with the door as the position information is updated by a new series of images as monitored by the computer. As the cab approaches the opening, the speed thereof may be automatically decreased until the cab contacts the aircraft. Pressure switches may be mounted around the perimeter of the cab opening contacting the aircraft to verify to the computer the complete contact of the cab and the vehicle opening. An electro-optical device mounted in the cab may be utilized to sense the height of the aircraft in relation to the cab. If the vehicle height varies during loading or unloading, these switches provide signals to the computer which will produce drive signals to the hydraulic cylinders thereby maintaining the cab at the same level as the opening.

The bridge may be automatically retracted from the aircraft, and returned to its original stowed position prior to departure, in response to a signal to the computer initiated by the marshaller or be initiated by a sensor determining the door has been shut prior to departure and a further verification that departure is intended.

BRIEF DESCRIPTION OF THE DRAWINGS

The following figures illustrate the preferred embodiment of the invention, wherein:

FIGS. 3D through 3G represent machine readable patterns for identifying aircraft type illustrated in one embodiment of the invention.

FIGS. 4 to 15 illustrate the sequence of steps involving automatically initiating and docking a passenger bridge with an aircraft according to the invention.

FIGS. 19 to 22 illustrate various images as observed by the camera corresponding with the various positions of the bridge in this regard.

DETAILED DESCRIPTION OF THE DRAWINGS

The function of the system as seen in the figures is to automatically initiate and control the movement of an airline terminal passenger bridge B into position to meet an arriving aircraft A, or to let a departing aircraft A leave the terminal. The system is either automatically initiated when an aircraft arrives or is initiated by an authorized individual. It will not be necessary for the authorized individual to have any special training in passenger bridge movement, only a familiarity with the system controls.

The imaging system as seen in the figures will consist of several elements which combined together will be able to determine the location of the passenger bridge B as well as sense the location of the aircraft A. When commanded, the system command will drive the bridge B in a safe manner, avoiding all obstacles on the ground, to the appropriate position commensurate with the command.

For a departing aircraft A the system when commanded will move the passenger bridge B several feet away from the aircraft A, sufficient to clear the fuselage.

When an aircraft A arrives at the gate the imaging system will determine the passenger bridge location. It will, using its position sensing system, determine the aircraft location. Then, when the appropriate command is given, the system will control the movement of the passenger bridge B, avoiding any obstacles on the ground, into the correct position to access the passenger door 10, 11 of the arriving aircraft A.

Equipment Description and Operation

Targets

Figure 1:
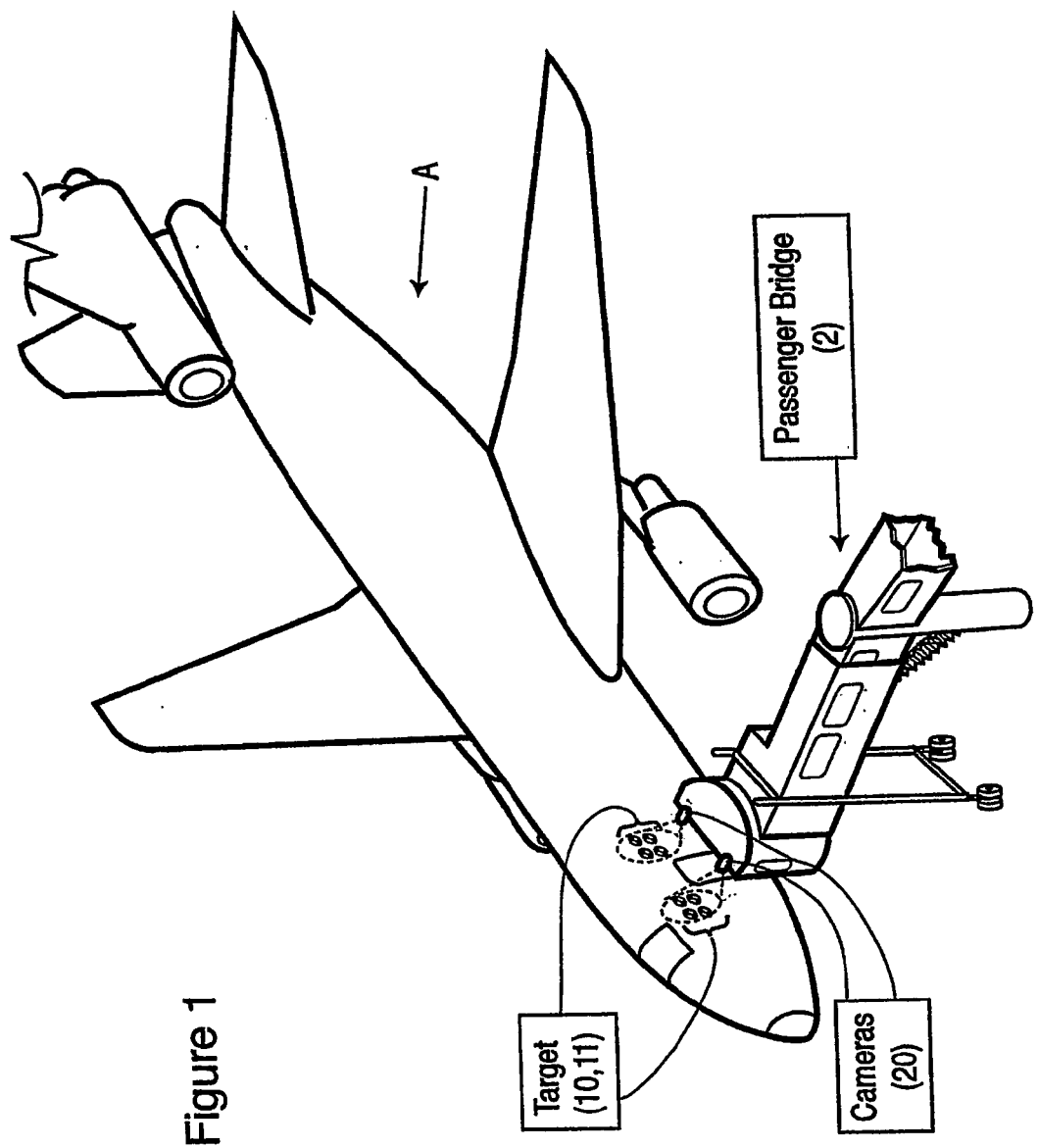
FIG. 1 is a schematic view of the aircraft and bridge located apart from one another prior to moving the bridge to the aircraft doorway.
Figure 2:
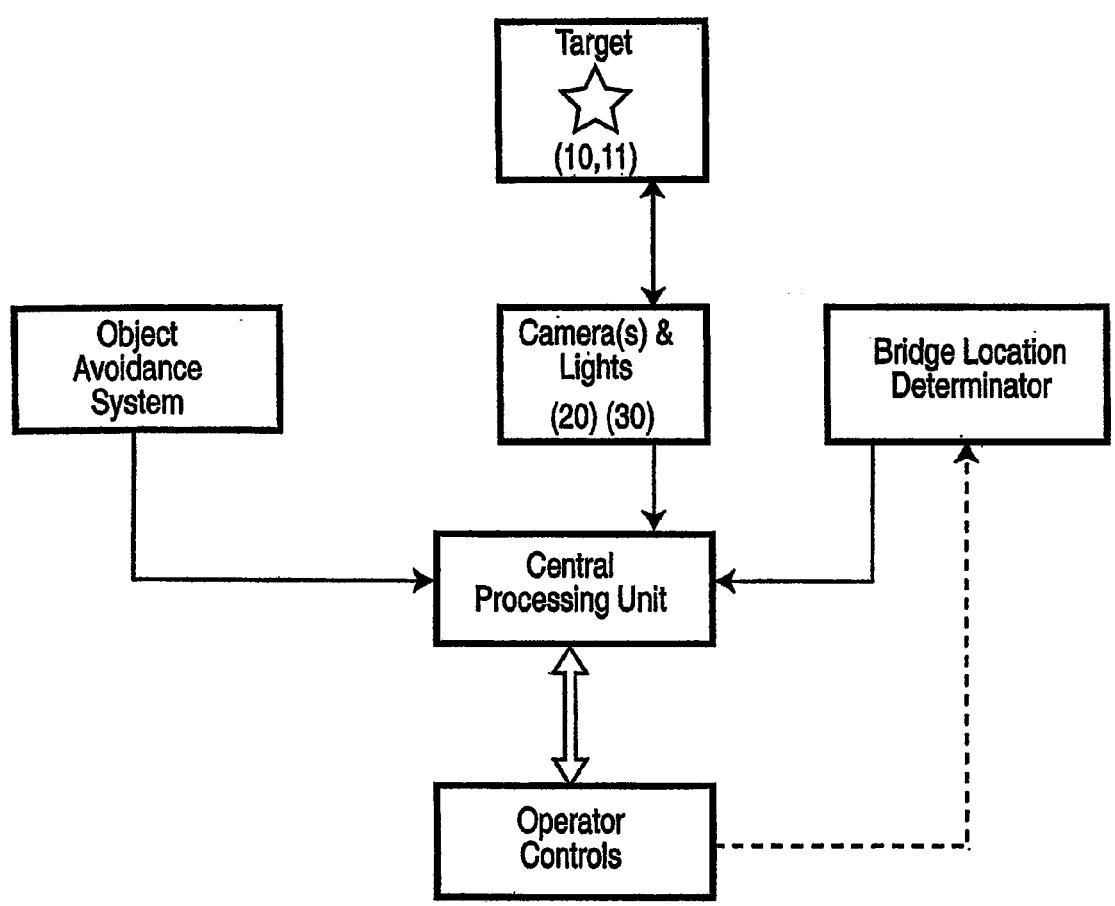
FIG. 2 is a flow diagram indicating the components of the system.
Figure 3B:
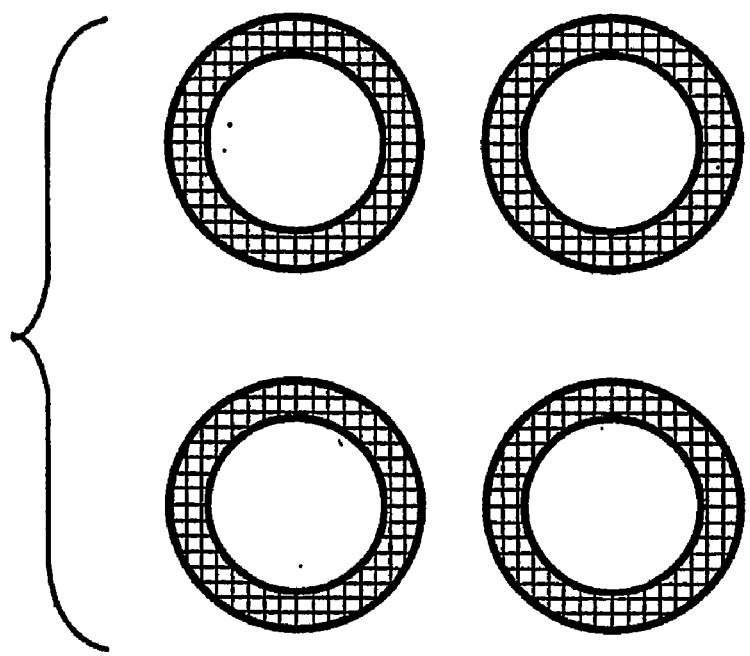
FIGS. 3A, 3B and 3C are examples of the targets that are used each illustrated in an embodiment of the invention.
Figure 3A:
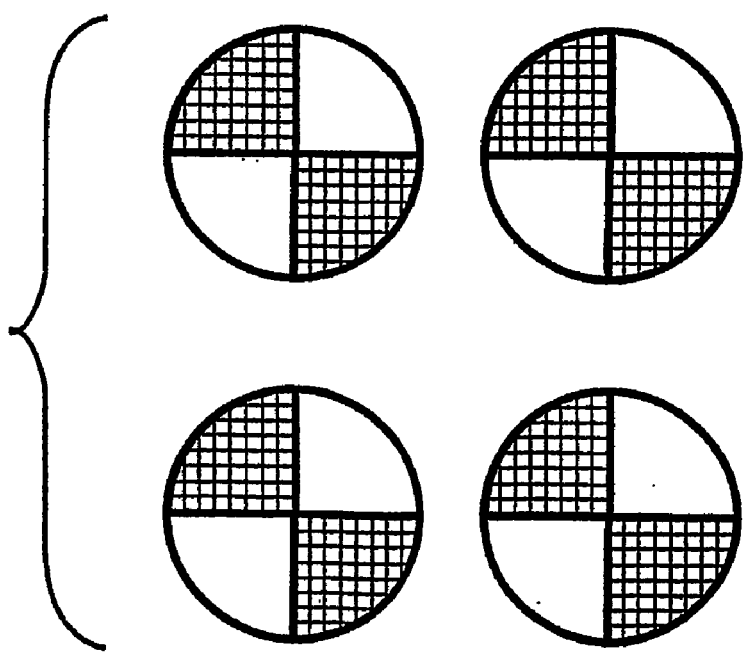
Figure 3C:
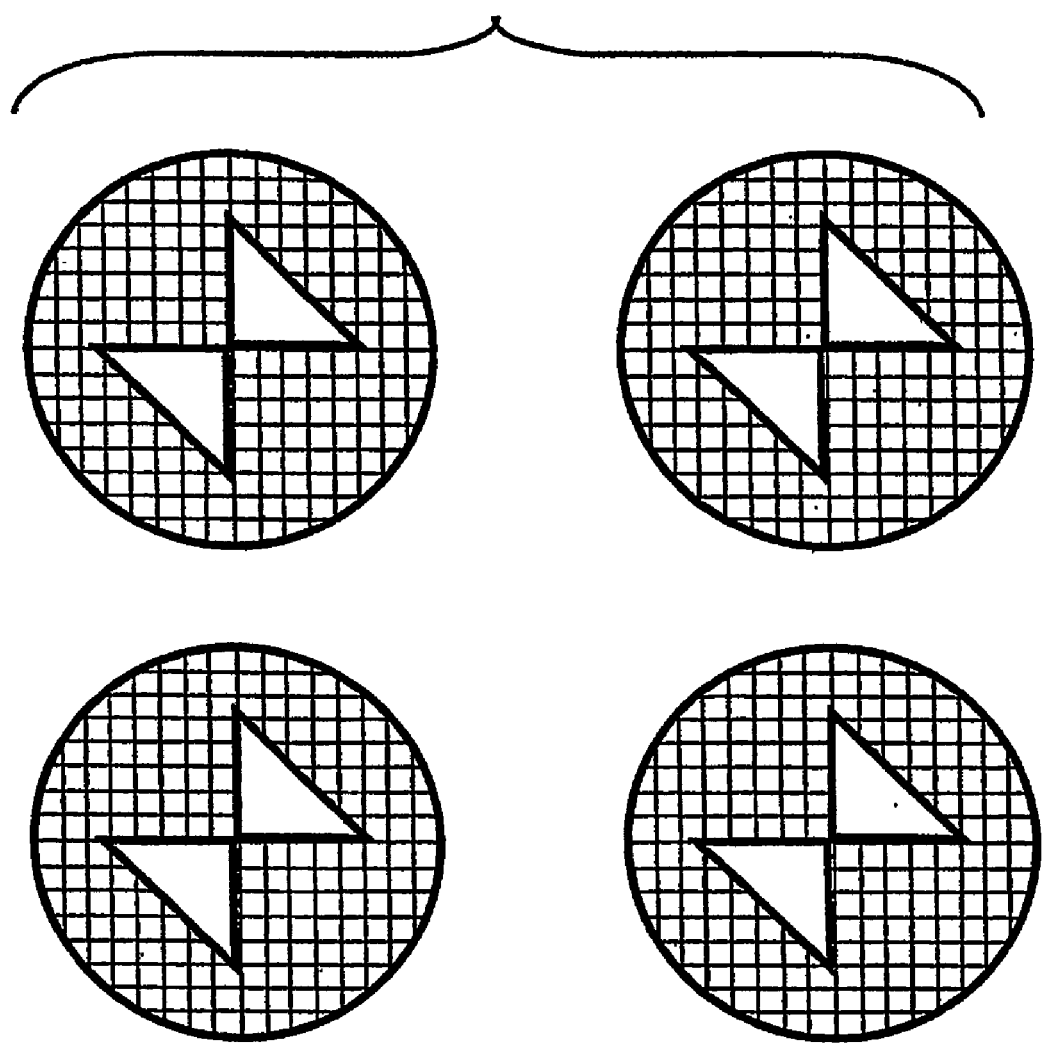

There will be at least one retro-reflective target 10,11 located on the aircraft A to indicate the appropriate location for the passenger bridge B to contact the aircraft A. The target 10, 11 is a passive symbol or object that can be easily affixed to the fuselage with no impact on the aircraft's airworthiness. The target is distinctive as seen in FIGS. 3A, B & C so that a position sensing system can easily, reliably and quickly identify it. The target 10, 11 is kept in the camera(s) 20 field of view whether the passenger bridge B is in contact with the aircraft A or whether it is standing back from the aircraft A.

The targets 10, 11 is of a retro-reflector material that can be applied to the aircraft as a peel and stick application.

Targets may be carefully placed in any predetermined location near the door, as long as (a) their exact location relative to the door is known, and (b) they can been tracked by the camera. The ideal location is near the corners of the door which correspond with the placement of the cameras near the extremities of the passenger bridge. The targets are of retro-reflective materials, for example as manufactured by the 3M Company under the trademark of Scotchlite®. This material includes glass micro-spheres bonded to a plastic base used to make said targets of a predetermined pattern having the required retro-reflective properties which enhance the visibility of the target clusters by the camera whether day or night conditions apply.

Initially the bridge is not assumed to be level with the door. In fact, the bridge may be positioned in any arbitrary orientation relative to the aircraft. The actual position and orientation of the bridge can always be directly measured by the bridge sensors, and the imaging system can determine both the location and the orientation of the surface on which the targets are located. Therefore, the absolute position and orientation of the aircraft can easily be calculated. Neither the cameras nor the bridge has to, necessarily, be normal to the target surface. The field of view of the cameras is sufficient to cover the area in which the targets are expected to be even when the bridge is not aligned with the door. As long as the targets are visible by at least one camera, the bridge drive may be used to reposition the bridge cab—and hence the cameras—in a suitable orientation for successful attachment to the aircraft door.

As a minimum, the system would employ one camera and one target "cluster," for example a duster consists of three or more individual elements. Since this imaging system relies on the apparent size and shape of such a target duster to determine the location and orientation of the surface on which the targets are placed (as seen in FIGS. 19 to 22), no additional data is needed for successful operation. In the preferred embodiment, one target duster is used for each of a plurality of cameras; however, some or all cameras may share a single target duster, and alternatively, more than one target duster may be used by some or all cameras. Increasing the number of target dusters will offer greater accuracy, fault tolerance, and reduce system complexity and cost.

The figures illustrate the bridge being normal to the door on approach; as will usually be the case. However, as described above, this is not essential for the successful operation of the imaging system.

Machine Recognizable Pattern to Identify the Aircraft Type

In FIG. (3D), a machine-recognizable pattern for identifying the aircraft type is shown. In this example, the pattern is comprised of up to six individual elements. For this example, the specific type of aircraft is identified by using elements number 1, 3, 4, and 6. Using such a system, in theory, up to 64 different aircraft types may be encoded. In practice, many of the 64 patterns should be avoided since they may result in ambiguous interpretation by the vision system, or to reduce the probability of a mistaken interpretation.

In FIG. (3E), a different pattern is shown, this time with elements number 1, 2, 5 and 6 being used.

As seen in FIGS. (3D) and (3E), the pattern is located in a fixed position relative to the main target duster used for determining the position of the aircraft relative the passenger bridge. This allows the vision system to easily locate each individual element of the target pattern, and decode the aircraft type by observing which of the individual pattern elements is present, and which is absent.

In FIGS. (3F) and (3G), an alternate method is used to encode the aircraft type. When using this method, certain geometrical properties of the pattern are used to identify the aircraft type, for example, the relative distance between pairs of lines are used to encode the aircraft type.

In FIG. (3F), the pattern is comprised of three lines. The two outermost lines are "goalposts", essentially determining the envelope of the whole pattern, while the position of the middle "indicator" line encodes the information. In this figure, the indicator line is 60% of the distance between the left and the right goalpost lines (so that the distance between the left goalpost line and the indicator is 1.5 times larger than the distance between the indicator and the right goalpost line).

In FIG. (3G), the same method is used as in FIG. (3F), but this time the indicator line is 80% of the distance between the left and the right goalpost lines (so that the distance between the left goalpost line and the indicator is 4 times larger than the distance between the indicator and the right goalpost line).

The amount of information that can be encoded using the pattern shown in FIGS. (3F) and (3G) depends on the inherent resolution and accuracy of the camera means and the image processing software.

The image processing software uses this information, encoded in the ratio between the different spacing between the three lines, to convey data about the aircraft type. For example, the pattern in FIGS. (3D) and (3F) may correspond to a Boeing 737–300 aircraft, while the pattern in FIGS. (3E) and (3G) may correspond to an Airbus-320 aircraft.

"Bowtie" Target Pattern Figure

In FIG. (3C), a preferred pattern for a single target is shown. This pattern has several features allowing it to be easily recognizable and to give an accurate positional reading:

1. This type of "checkerboard" pattern is 'unnatural', in the sense that it is very unlikely to appear unintentionally as a part of another object that the camera means is viewing.
2. The sharp contrast between the dark and the bright portions make it easier for the camera means to discern even in poor visibility conditions.
3. The shape of this individual target is not significantly altered when viewed from an angle, as opposed to being viewed "head on".
4. All features of the pattern are large, monochrome areas, as opposed to thin lines or dots. This makes it easier to discern using camera means which is of limited resolution, or alternately, allows for a larger viewing distance.
5. The main feature of this pattern is the crosshair at the exact centre of the pattern. This crosshair is presented as the border between alternating dark and bright areas.
6. The "crosshair" feature mentioned above is built of a horizontal and a vertical line. This makes it very easy to enhance and process using a standard rectangular matrix CCD and simple image enhancing software. To benefit from this property, the target has to be mounted such that the crosshair lines are parallel to the camera sensor matrix X and Y axes.

7. Other than the "crosshair" feature, no part of the pattern contains any horizontal or vertical borders or lines. This means that when the image enhancing software described above is used, the crosshair feature—and only the crosshair feature—will be enhanced. This intersection between the horizontal and vertical lines provide for a sharp, unique feature on the target to be used as the centroid for the full target.
8. Since the shape is a well-defined, simple geometric shape, it is easy to reproduce accurately and cheaply.

Camera(s)

Camera(s) 20 will be the input device for the position sensing system. The camera(s) 20 will be directed towards the parked, arriving aircraft A and will have the target 10,11 within their field of view. The output of the cameras will be transmitted directly to the Central Processing Unit (CPU) 40.

There will be lights 30 mounted adjacent to the camera(s) 20, which will illuminate the aircraft A and the target 10, 11.

The camera 20 and lights 30 will be mounted in a suitable position on the exterior of the passenger bridge B. The location will be determined to provide the best, unobstructed view of a parked aircraft.

At least one camera must be present to provide sensing of target. A plurality of cameras offers increased accuracy and fault tolerance. In a preferred embodiment, two digital cameras, for example CCD cameras, are used, mounted one on each side of the passenger bridge or access-way. To provide useful stereoscopic vision by the cameras, the cameras should be mounted at a sufficient distance from each other to offer different views of the targets.

The cameras will be pointed in such a way that the main optical axes of all cameras are parallel to each other. Alternatively, cameras may be pointed to an arbitrary point near the estimated location of the targets once the aircraft is in its final parked position.

The lens used by the cameras will be selected such that the focal length would provide a field-of-view sufficiently wide to cover the aircraft approach zone, while still offering sufficient resolution to accurately measure the position of individual targets in the target groups. In a preferred embodiment, since the cameras are mounted on the passenger access-way, a field of view of 20 degrees, for example, provides coverage for the aircraft access zone while the bridge is retracted. Once the aircraft is parked and the bridge or access-way starts its motion towards the aircraft door, the decreasing distance to the target would—without any further provision provide a larger view of said targets. At the final stages of approach of the bridge or access-way to the aircraft, the targets would occupy all or most the cameras field of view, providing optimal target resolution at the time when it is most important.

Alternatively, an additional "broad-view" camera may be utilized in addition to the normal primary view camera, mounted in such a way or fitted with a wide-angle lens as to provide a view of the aircraft approach zone. When used in this manner, the camera(s) will be used for pointing the bridge or access-way to the targets, and then using a narrower field of view lens, allowing for higher target resolution.

Alternatively, a variable focal length "zoom" lens may be used in the camera.

When used, the camera(s) will initially start with a short focal length, providing a wide-angle view for approach. The focal length will then be increased in steps or continuously as the bridge or access-way approaches the targets. When used in such a way, a provision is made for the computer to detect or measure the focal length of each lens at any given moment, in order to correctly calculate the actual distance of the cameras from the targets.

In another embodiment, the camera, (or all cameras jointly, or each of a plurality of cameras independently), is mounted on a pan- or pan-and-tilt gimbal, where the pan- or pan-and-tilt motion is controlled by the computer. In this embodiment, the motion of said camera(s) may be controlled independent of the motion of the bridge or access-way. This allows for the camera(s) to scan the aircraft access zone even when the bridge or access-way are located or pointed in such a way as would otherwise impede the operation of camera(s) affixed to the bridge frame without such pan- or pan-and-tilt maneuverability. When used in this manner, the computer controls the motion of all camera gimbals, and is equipped with sensors to detect the momentary yaw, or yaw and pitch, of the cameras. Such pan- or pan-and-tilt apparatus may alternatively or conjointly be used for the broad-view camera mentioned above.

In a preferred embodiment, the rotary motion of the final joint of the passenger bridge (the "cab") may be used to pan the camera(s) to scan for an approaching aircraft, and to point said camera(s) in an optimal direction to detect the targets and direct motion of bridge or access-way towards the targets.

The ability to determine the position and orientation of the surface on which the targets are located is a direct result of the placement of the targets adjacent the aircraft opening/door and the subsequent computer processing of the geometrical observations of the cameras. A stereoscopic vision alternative embodiment is provided as a means to enhance the spatial accuracy of the invention. The method for using two cameras to create stereoscopic vision is a standard practice in the field of Machine Vision, and is a straightforward implementation for anyone skilled in the art.

A preferred Charge-Coupled Device (CCD) camera is recommended and has become the standard for electronic cameras and digital photography. Examples include: Dalsa IM15; JAI CV-A1; Pulnix TM-200; Hitachi KP-F110; COHU 6612–3000.

Electronic cameras mounted with a zoom lens usually use a servo mechanism which controls the adjustment of the focal length. In such a configuration, the computer would both command a specific focal length, and receive the current actual focal length of the zoom lens as input to the calculation.

When the camera(s) are mounted on a pan- or pan-and-tilt gimbal, a servo mechanism is used to control the gimbal angles. Reference is made to U.S. Pat. No. 6,191,842 (and/or U.S. Pat. No. 5,900,925) and U.S. Pat. No. 5,633,681 in this regard the teachings of which in relation to pan- or pan-and-tilt gimbal are hereby incorporated by reference. Other examples are available as well.

Lighting

At least one light source will be affixed to each camera, preferably by enclosing both camera and said light source in a single enclosure, allowing the light source to be aimed in bore-sight to cover the area observed by said camera. The efficiency of the lighting source in the embodiments of the invention is enhanced in one or more of the following methods:

1) Limiting the spectrum: a lighting source may employ a monochromatic light, for example a LASER emitter, or a filtered floodlight, or a special-purpose light bulb which is rich in one part of the spectrum. When such a monochromatic light source is combined with a matching filter in the camera, the contrast of the image illuminated by the lighting means is greatly enhanced, providing for easier discerning and discrimination of the target.

2) Stroboscopic lighting: by using short bursts of light, as opposed to continuous illumination, and synchronizing the camera with the short illuminated periods, the effective illumination of the target may be greatly enhanced, while maintaining the apparent amount of light visible to the human eye to a minimum, and reducing overall power consumption. This has the benefit of avoiding harsh lighting which may interfere with the pilots and other personnel in the vicinity.

3) Extending beyond visible light: to further reduce interference to personnel, or in lieu of the methods above, lights using an invisible part of the spectrum may be used. Infrared light is the preferred choice, since it is cheap, powerful, and harmless. An appropriate infrared filter will then be added to the camera means to reduce extraneous light interferences from being observed by the camera.

4) An additional secondary "out-of-line" light source may be added to the system to further enhance contrast. This secondary light source would be placed away from the imaginary line connecting the camera and the target. When such secondary light source is used, the camera will first acquire an image while only the primary (bore-sight) light source is illuminating the target. This would be followed, in rapid succession, by acquiring an image when only the second light source is illuminating the target. The two images would then be subtracted from each other by the computer. Since the targets are designed to reflect light only in the direction from which they are lit, the targets would appear considerably brighter when lit by the primary light source than when lit by the secondary light source, while the rest of the image would generally appear approximately the same. Subtracting the two images would tend to produce a highly-enhanced image in which only the targets are visible, making target discrimination much easier.

When such secondary lighting is used, one such source is common to all cameras. Alternatively, the primary light source may be attached to one camera and may be used as the secondary light source for all other cameras, if the angular distance between said cameras is sufficiently large.

Just like the sight on a rifle, each camera and its accompanying light have to point to the same direction, cover the same (conical) field of view, and be in close proximity to each other. When using a telephoto lens and narrow-beam light source, this alignment involves careful calibration of camera with light in a common fixture. With standard field of view equipment, such calibration is not needed. Providing the camera and light source in a common pre-machined fixture would by itself force the two to be aligned in such a "bore-sight" manner. The proximity of camera and corresponding light source is desirable because of the retro-reflective characteristic of the targets. Since the targets are designed to reflect light substantially only in the direction from which that light has arrived, the cameras have to be positioned dose enough to the light in order to readily receive the light reflected by the target and target clusters.

If a telephoto lens and a narrow-beam source are utilized, the calibration process can be completed during the fabrication and assembly phase. Once the combined unit is built and sealed, no further individual alignment between camera and light is needed. The combined unit may still have to be aligned with the area in which the targets are expected to appear. Please note that such narrow field of view cameras would generally be used only in conjunction with one or more "broad-view" cameras, as described herein.

Most stroboscopic light sources, as well as most electronic cameras (such as used in the preferred embodiment) can be "slaved" to an external trigger. Such an external trigger controls the exact moment at which a strobe will emit a pulse of light, and when an electronic camera will sample the data on its sensor. By sending the same external trigger signal to both the light source and the camera at once, the system guarantees that the image will be "observed" by the camera at the same moment as the pulsing of the strobe. This is similar in concept to the operation of a flash attached to a standard camera, where the flash is synchronized to the film shutter via an integral shoe on the camera for the flash or via separate connectors.

In the preferred embodiment, the trigger signal to the cameras and to the stroboscopic light sources is issued by the computer. If a plurality of cameras is used, the triggers for different camera/light pairs may be staggered, for increased target discrimination ability. Each of the plurality of cameras would observe the targets only when the light source attached to that camera is illuminating the targets, without interference by light sources attached to the other cameras.

Bridge Location Determinator

The movement of the passenger bridge B first requires that the current location is known. To determine the passenger bridge location several methods could be used. Four possible options are briefly described. A device to continuously sense the rotation and steering direction of the passenger bridge drive wheels could provide the location. An alternative method to provide the location would be to sense the bridge segments translation and the angular position of the bridge B with respect to the terminal. A third option would be to place targets immediately below the passenger bridge B or on the terminal and use an additional camera to determine the location of the passenger bridge B. The current position of the bridge B, would be communicated to the CPU and during bridge motion, this position would be continuously updated.

Another approach is to use a GPS/INS (inertial navigation system) to continuously locate the passenger bridge B. Such a system might be produced by a company in Markham Ontario, Canada called Applanix. The advantage to the third and fourth option system is that they would be able to be attached to an existing bridge with out having to make any modification to the bridges operating systems.

Object Avoidance

To safely operate the passenger bridge B automatically, there is a requirement for an object avoidance system. This system will recognize equipment, objects or personnel that would be in the path of the moving passenger bridge B and command the bridge B to stop. There is an object avoidance system installed on some Ford Windstar® vans. The system would communicate directly with the CPU.

Another approach is to use a device commonly known as a "safety hoop", which is a ring-shaped contact switch circumscribing the passenger bridge "bogey" driving wheel bay. This safety hoop is installed in such a way as to sense contact with objects or personnel in its path, and to immediately shut off the motors driving the bridge. When using such a safety hoop, it may either be connected to the CPU, or connected directly to the drive motors, cutting off supplies once activated.

Central Processing Unit (CPU)

The Central Processing Unit will contain the microprocessor, input and output devices and signal conditioning devices to communicate with and control the other system elements. The position sensing and bridge drive commands will be performed by software residing in the CPU. Other functions, such as the bridge location determinator and the object avoidance, will also be software controlled.

The bridge will move to meet an arriving aircraft A either auto-initiated or initiated by an authorized individual. The target 10,11 of the parked aircraft A will be in the camera's 20 field of view so the target 10,11 can be "acquired" by the system. With the target acquired, the position of the bridge B will be compared to the target position and the bridge B will be commanded to move toward the aircraft target 10,11. The object avoidance system will be functioning to ensure that the area in the path of the bridge B is clear of objects. Once the bridge B has made contact with the aircraft A the system will revert to a safe mode.

For departure from the gate, the system will auto-initiate upon sensing the aircraft door is closed to be initiated by an authorized individual. The gate will move away from the aircraft while the position sensing system continuously determines the relative location of the aircraft A and the passenger bridge B. The object avoidance system will be functioning.

As seen in FIGS. 19 to 22 a fixed image would look different depending on the point from which it is viewed. If the position of the camera viewing the image is known, the different views can be used to derive the position of the image. A known pattern of FIG. 19 is used as the target, and a known camera(s) position (on the cab) is used to calculate the location and orientation of the surface on which the targets are located, in this case the door/opening of an aircraft.

Figure 10:
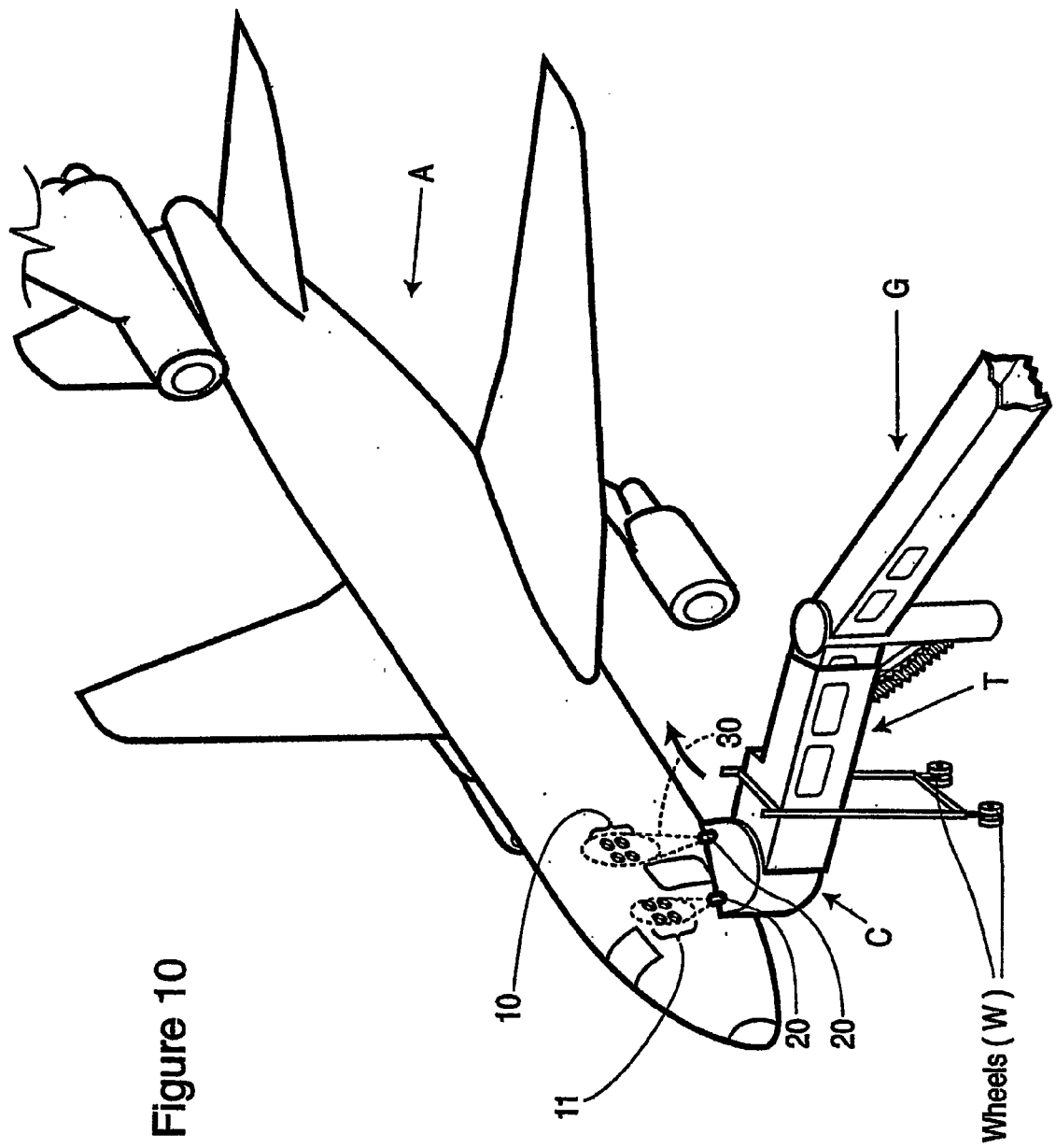
Figure 11:
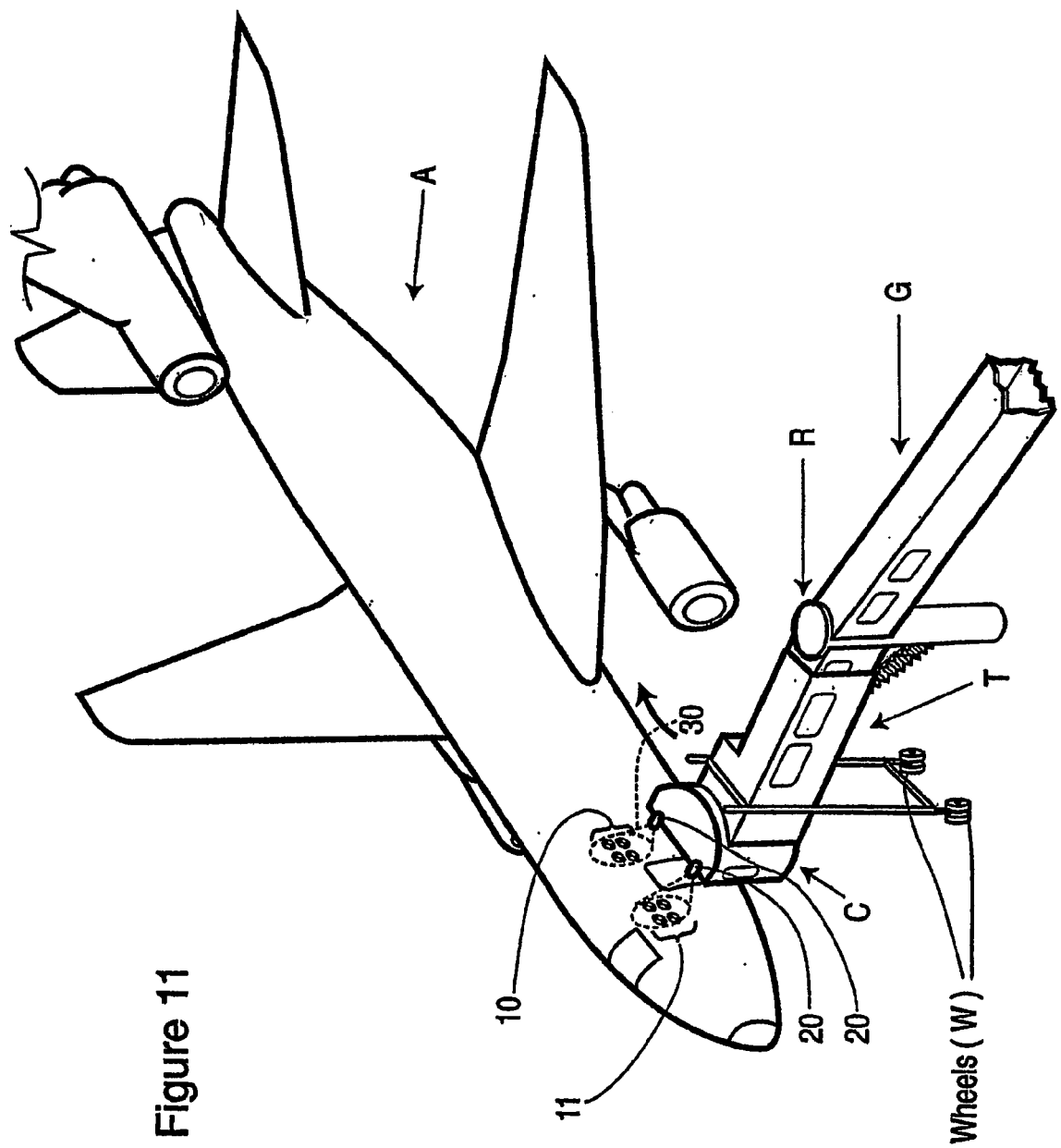

Referring to FIGS. 19 to 22, the target clusters are shown in four different views relative to the camera. In FIG. 19, the targets are located on a surface normal to the camera viewing direction, and fairly close to the camera (actual distance would depend on actual size of target cluster and focal length). In FIG. A, the targets are at the same height as the camera, but to the left of it (the two left targets appear closer to each other than the two right ones, meaning the right ones are further away). In FIG. 10, 11 the targets are far above the camera, and slightly to the left of it In FIG. 22, the targets are in the same direction as they are in FIG. 10,11, but they are farther away from the camera. Once the position of the targets has been calculated relative to the camera (and hence relative to the bridge), the bridge can be controlled by instructions from the computer to move towards the door. Any inaccuracies in such motion can be quickly corrected, since the targets are in constant view by the camera, and the targets position relative to the camera/bridge is continuously updated. Both the position and the orientation of the door can be calculated by the computer from the appearance of the targets, hence both the bridge position and its attitude can be controlled for optimal attachment to the aircraft door.

Software

Figure 15:
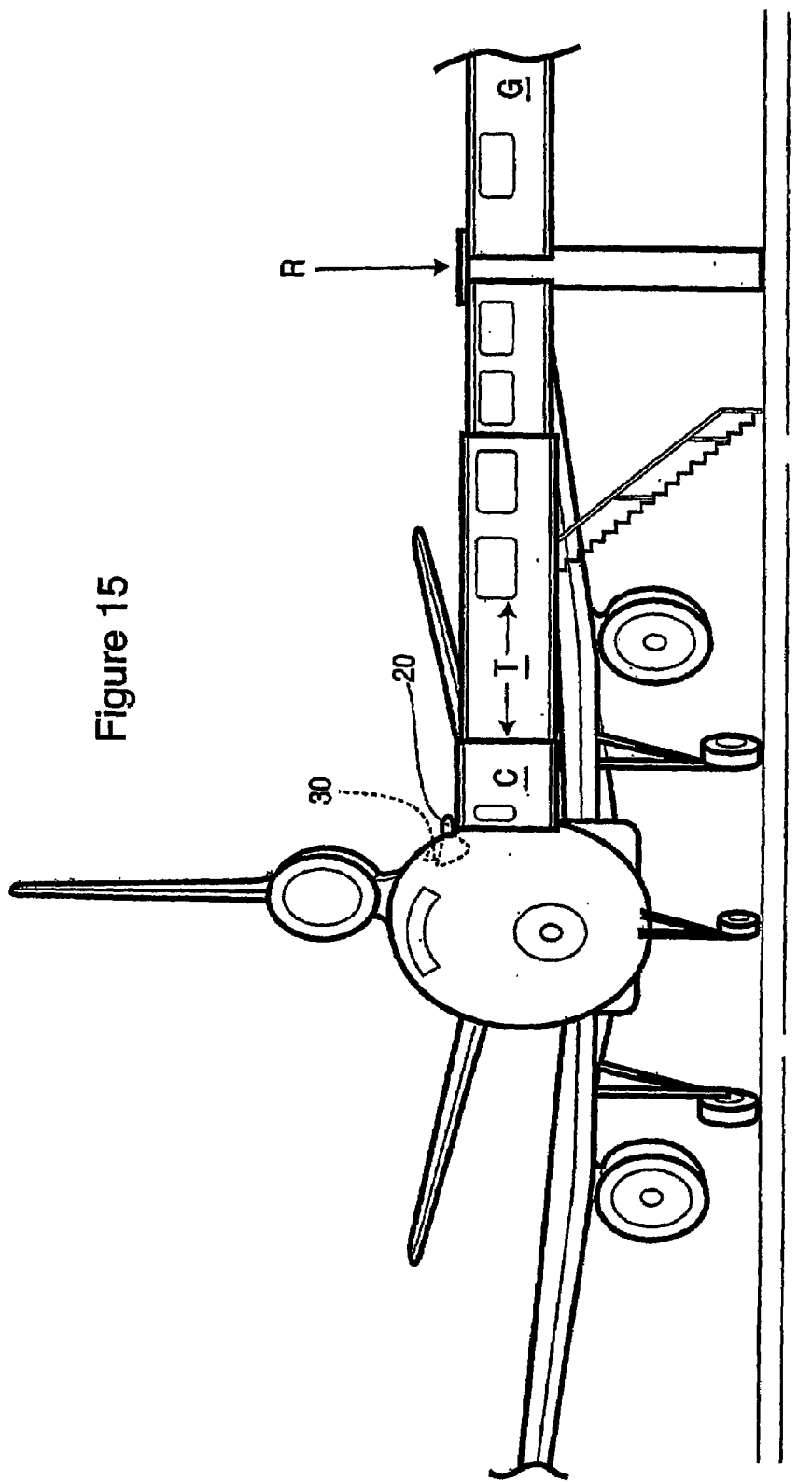
Figure 16:
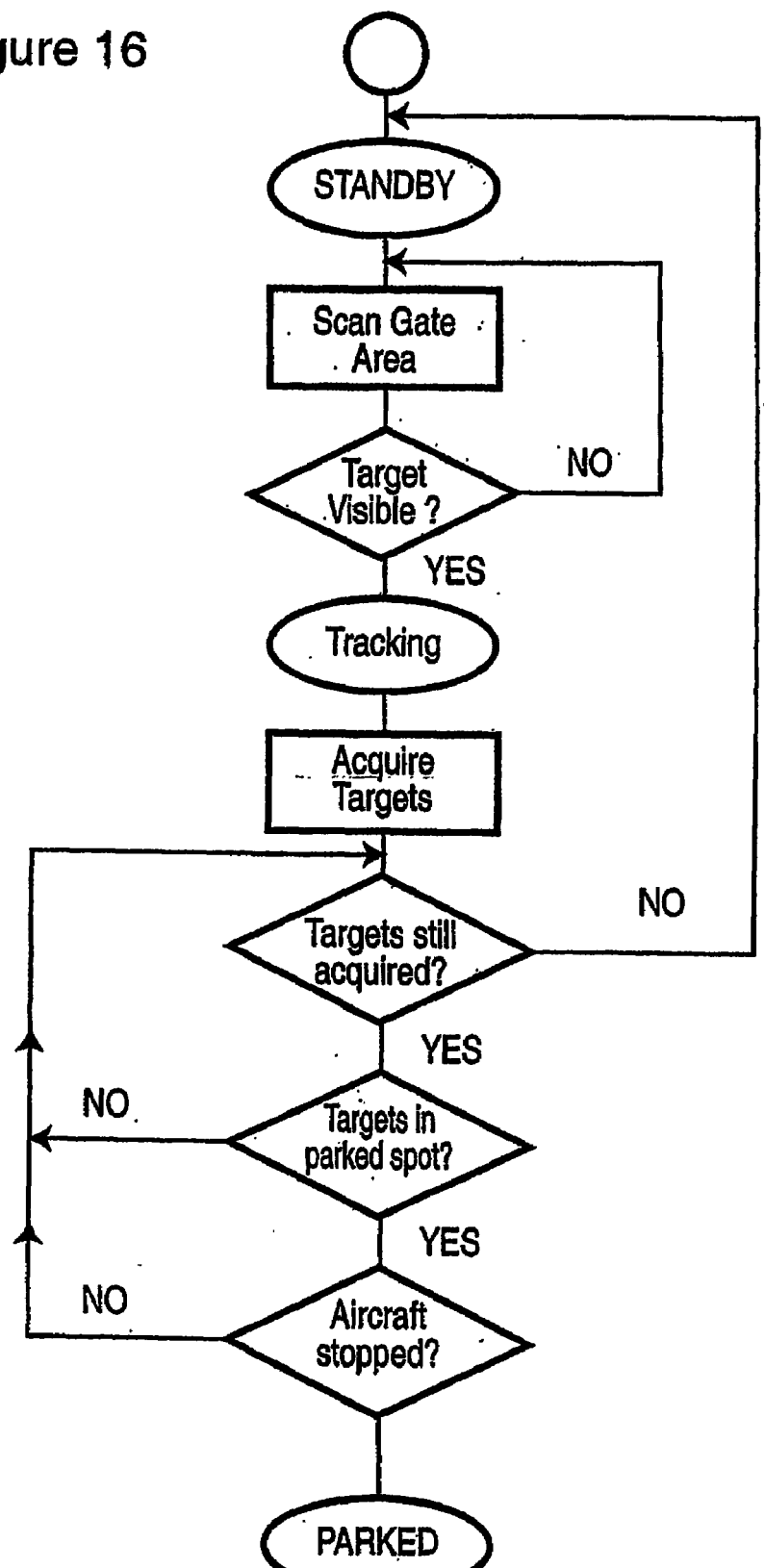
FIGS. 16 to 18 illustrate the logic utilized by the system of the invention to follow through the steps illustrated in FIGS. 4 to 15.
Figure 17:
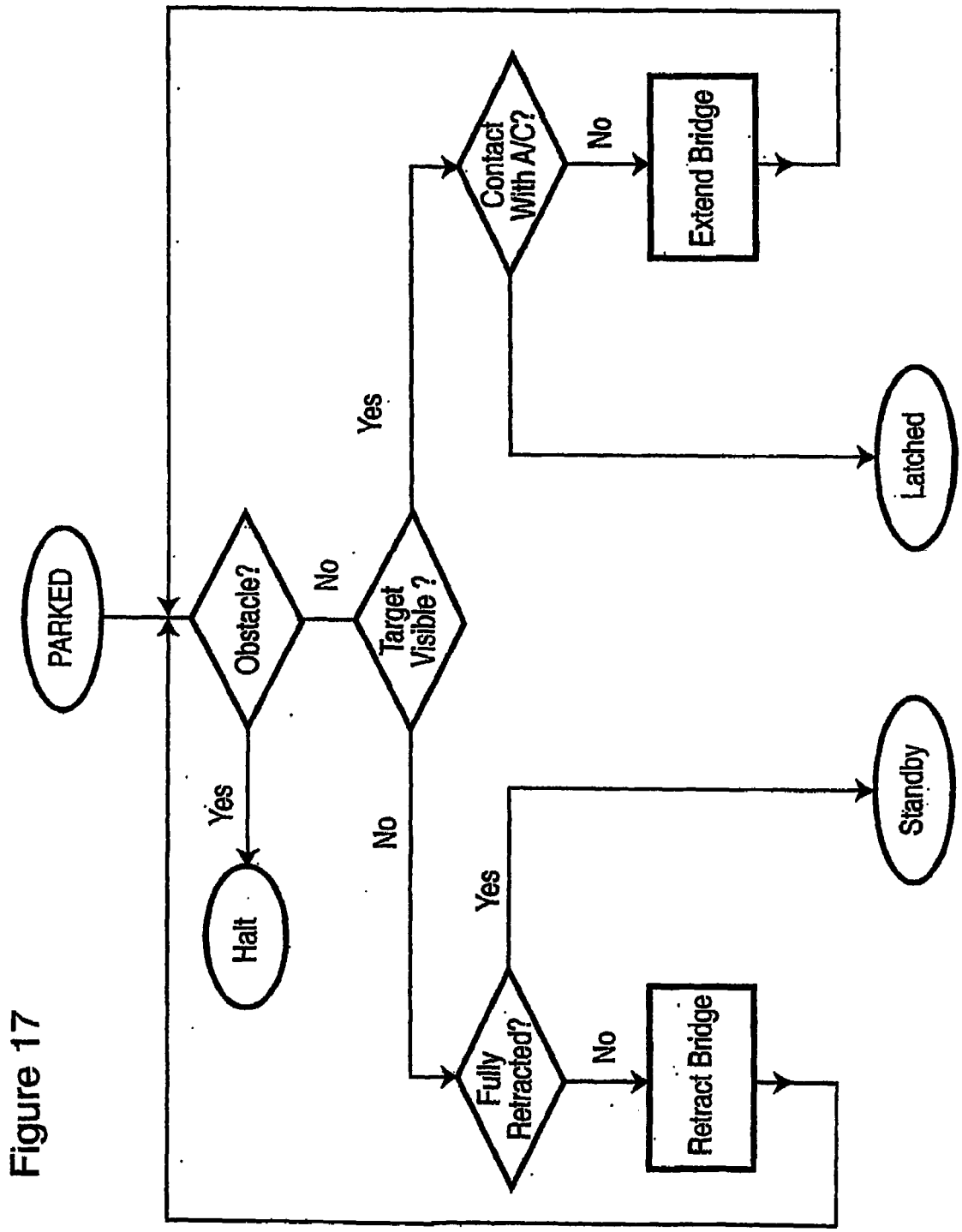
Figure 18:
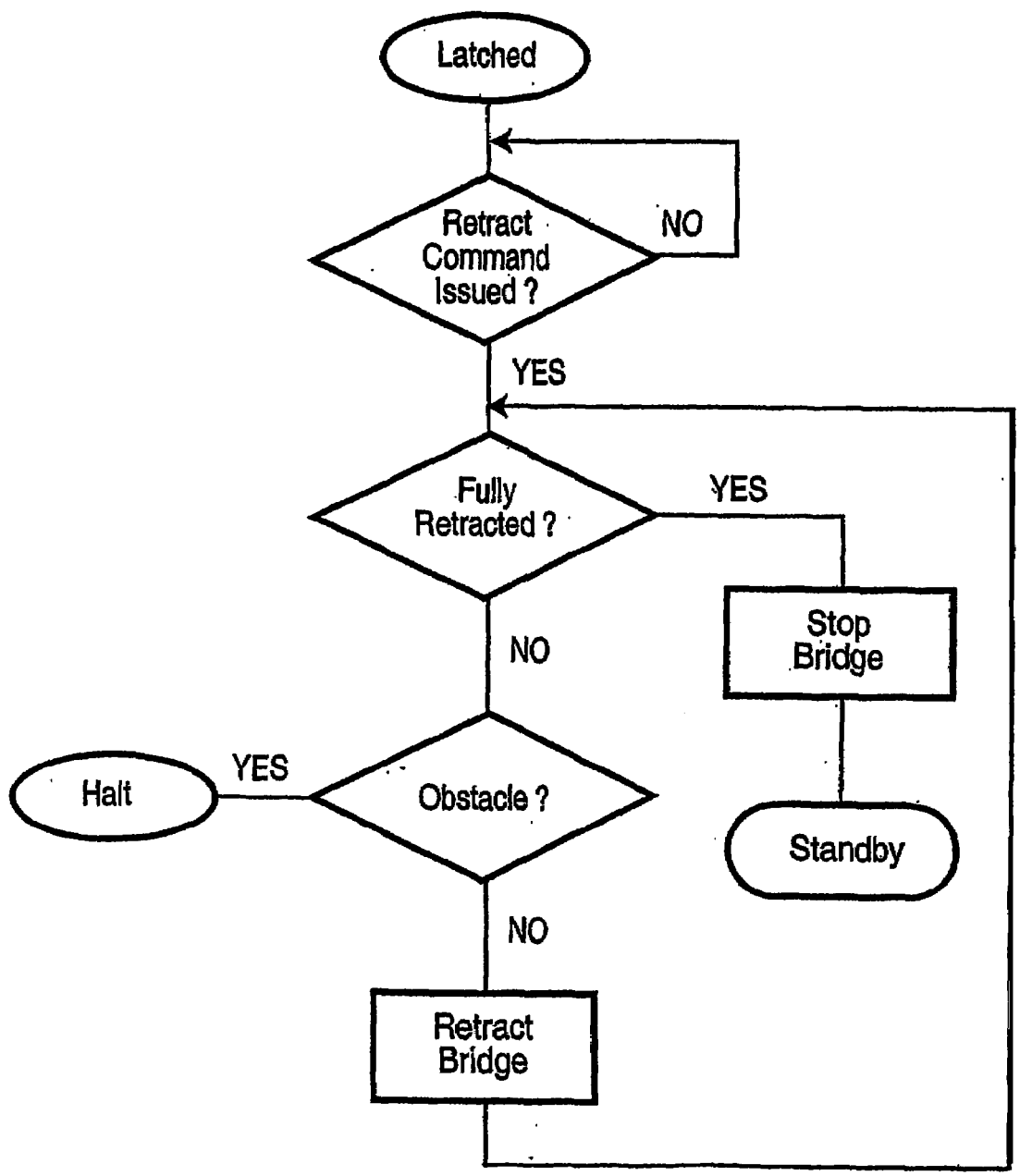

The flow charts provided herein in FIGS. 16 to 18 are self explanatory. Referring now to FIGS. 4 through 18 the present invention provides automated initiation or semi-automated initiation for computerized control of a passenger personnel bridge 10, or alternatively a cargo handling vehicle, to align the cab of the bridge with a door in a parked aircraft A. A cluster of retro-reflective targets 10, 11 are strategically placed adjacent the door so as to be recognized by the computer. A manual override is also provided for all functions as required.

The automatic function provides for the continuous monitoring and operation of the gate area in standby mode until an arriving aircraft A is sensed, which alerts the system until the aircraft has substantially parked at which point the computer initiates the docking procedure or a qualified individual does so, for example the marshaller, after which initiation the entire system is automated. The bridge B includes positional sensors and drive actuators coupled to the various movable sections of the bridge including the rotatable fixed pivoting end of the bridge R attached to the terminal, the expandable length passageway T, the rotatable cab C with sensors indicating successful docking, and the variable height hydraulic cylinders connecting the truck which supports the bridge to the passageway. These positional sensors produce signals to communicate with the computer indicative of the position of the bridge in relation to the position of the parked aircraft as determined by the orientation of the various movable sections. A digital camera (CCD) and a light (laser) may be mounted separately on the same side of the cab portion C of the bridge B, or preferably together in a single housing on the cab portion C of the bridge B, to both illuminate the targets 10, 11 and capture images and to provide these raw images to the computer, also installed on the cab portion C of the bridge B. The digital images of the passive definitive retro-reflective targets positioned adjacent an opening of an aircraft are processed by the computer. These targets are readily distinguished from other images by their definitive nature. They may be positioned in clusters of two or more targets for improved accuracy.

Figure 6:
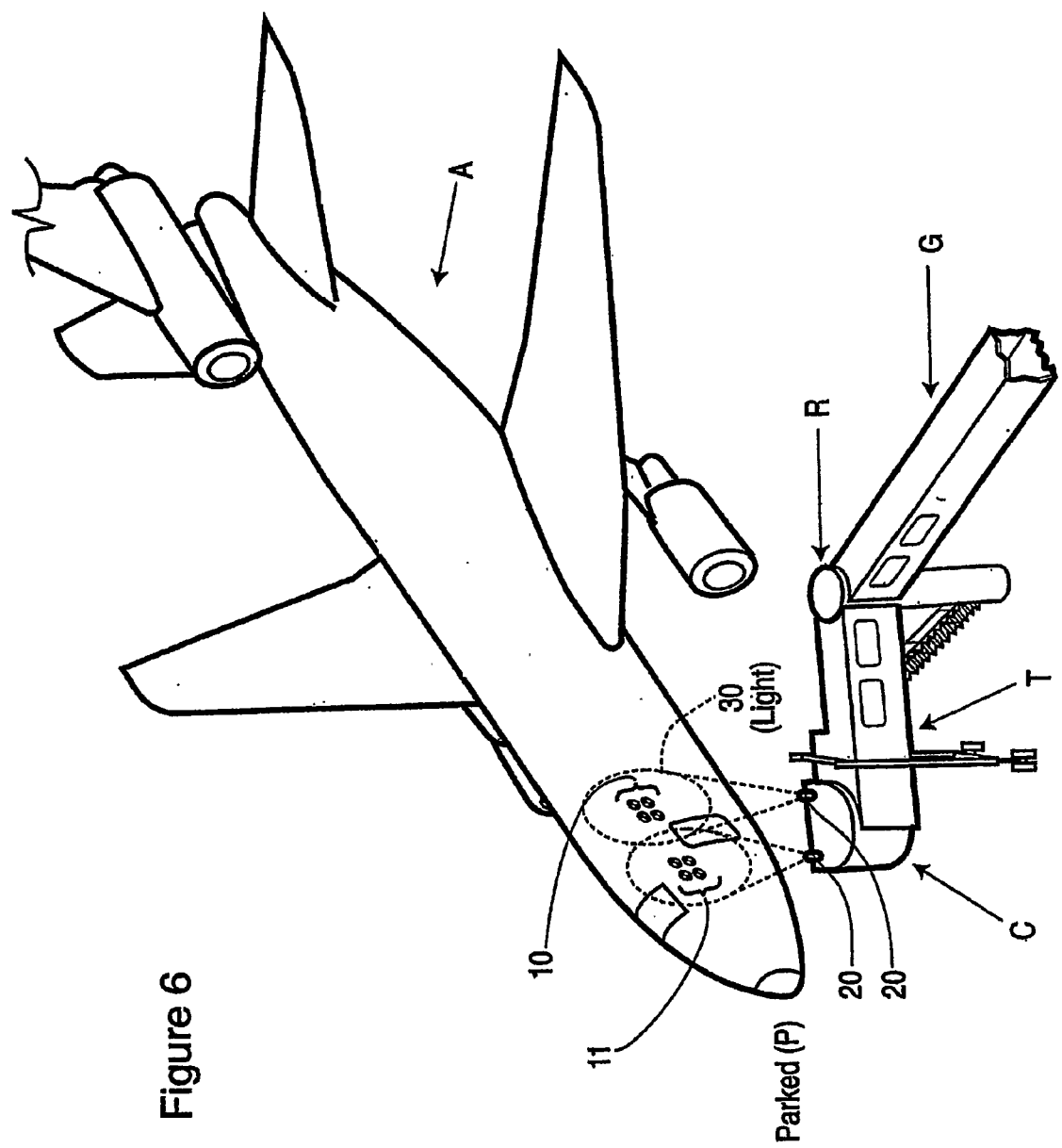
Figure 7:
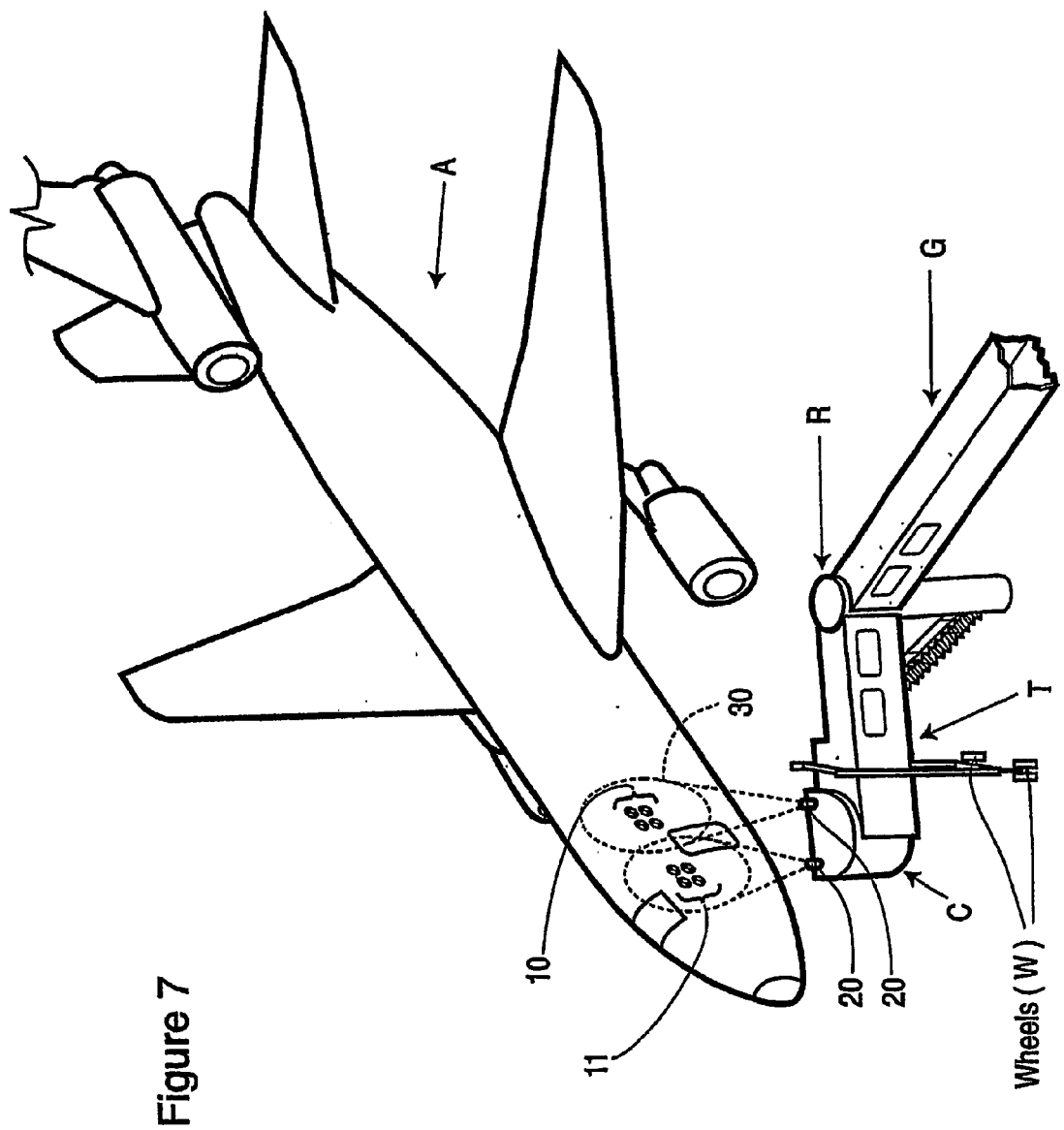
Figure 8:
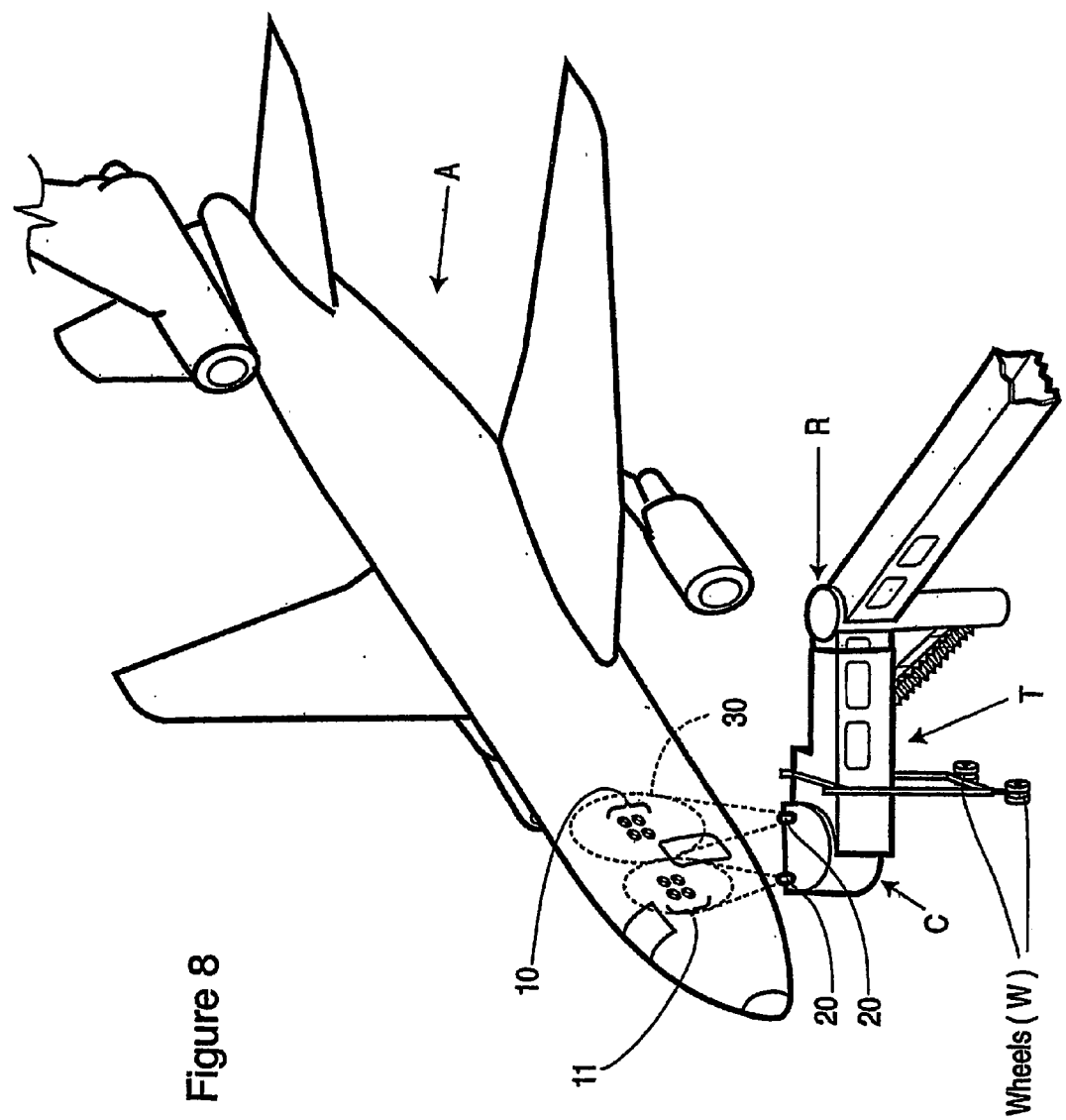
Figure 9:
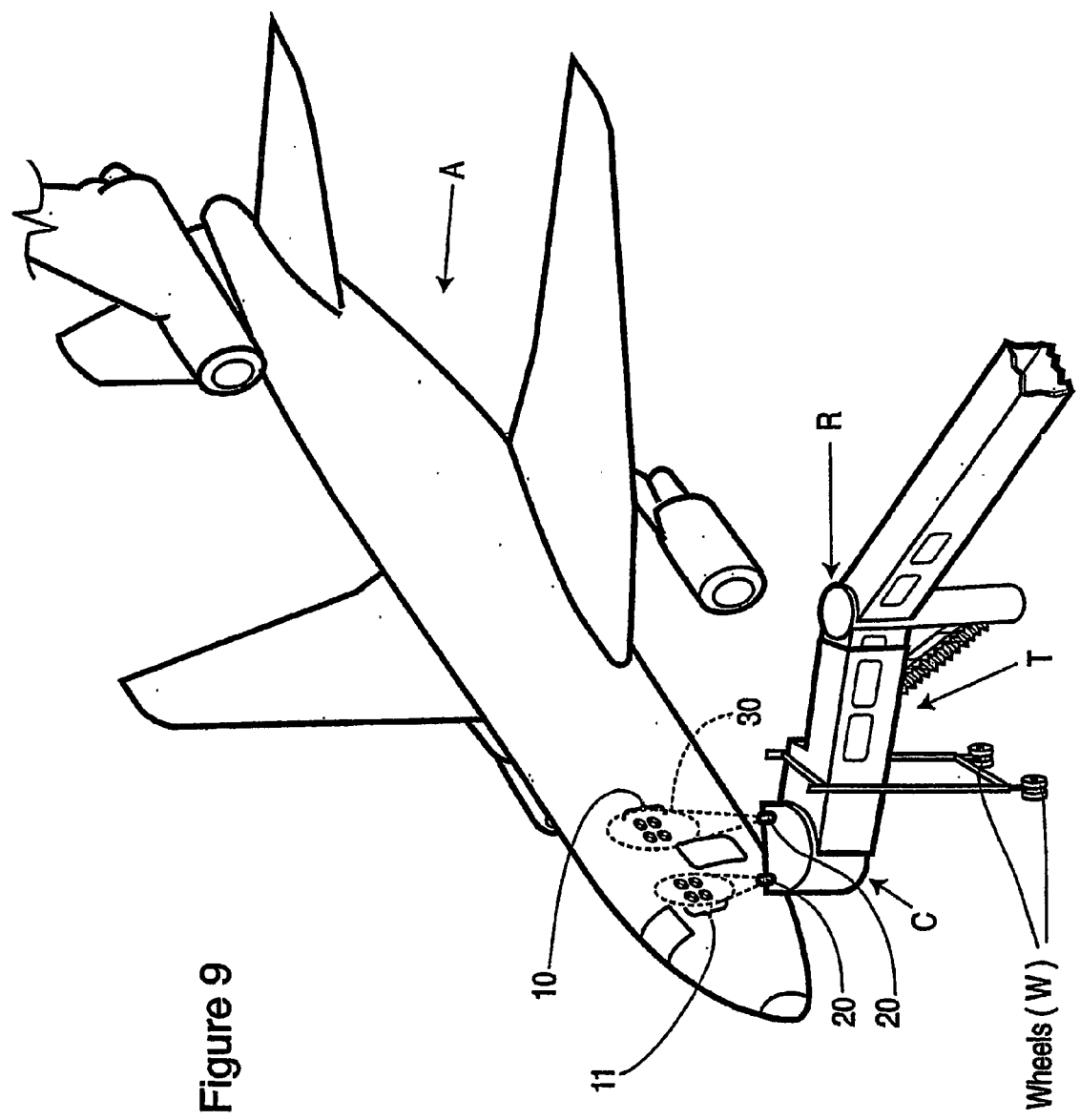

Upon initiation of the system, as seen in FIGS. 16 to 18 the computer will pulse a narrow cone of light as seen in FIG. 6 synchronized with the camera shutter to view the general area where the aircraft is parked and observe the targets 10 and 11. Based on the view of the targets as seen in the FIGS. 19 through 22 the computer will determine and actuate the necessary steps to align of the bridge B with the aircraft opening, as the bridge B is rotated about the rotunda R away from the stowed position adjacent the gate G while the computer continues to keep constant view of the targets 10 and 11, and following the extension of the tunnel T, the cab C can be rotated until the camera/light are substantially normal to the opening. The computer mounted on the cab of the bridge B responds to information provided by the images being processed and other sensors provided to produce signals that rotate the bridge B away from the terminal, extend the passageway T, and align the cab C with the targets 10 and 11. The images are processed by the computer based on software based algorithms to produce drive signals based on the computers understanding of the position of the cab C relative to the opening. These drive signals guide the bridge B along a path that will bring the cab C into alignment with the door as the position information is updated by a new series of images as monitored by the computer. As the cab C approaches the opening, the speed thereof may be automatically decreased until the cab C contacts the aircraft A. Pressure switches may be mounted around the perimeter of the cab opening contacting the aircraft to verify to the computer the complete contact of the cab and the vehicle opening. An electro-optical device mounted in the cab may be utilized to sense the height of the aircraft in relation to the cab. If the vehicle height varies during loading or unloading, these switches provide signals to the computer which will produce drive signals to the hydraulic cylinders thereby maintaining the cab at the same level as the opening.

The bridge may be automatically retracted from the aircraft, and returned to its original stowed position prior to departure, in response to a signal to the computer initiated by the marshaller or by initiated by a sensor determining the door has been shut prior to departure and a further verification that departure is intended.

Operator Controls

The system should be integrated into the existing operator controls so that the passenger bridge B can either be automatically or manually controlled. The required controls, should as a minimum include an on and off switch for the system, a command switch to initiate bridge withdrawal from the aircraft A and a command switch to initiate the passenger bridge approach to the aircraft. In addition there will be indicators giving the status of the system and the current location. But overall the controls should be as simple as possible to allow a minimally trained authorized individual to initiate operation of the bridge B.

Present Imaging System Advantages Over Prior Art

By automating the placement/removal of the passenger bridge to the aircraft a labour savings will be realized resulting in a reduction in delays. Further fuel savings will result with the reduction of the idling of aircraft engines during delays. Faster throughout is anticipated through a limited number of gates and a reduction in aircraft damage is expected.

Expected Advantages to be Realized in Part

Annual fuel consumption by APUs at gate is over 1.5 million liters
One aircraft is damaged by a ramp accident every 1700 departures
Ramp accidents at B gates costs about $2.5 million/year
Global cost of ramp accidents is over $2 billion
The cost of an aircraft delay is estimated at $50. per minute Passenger Bridge Types
Apron drive
Radial drive
Fixed telescoping
Custom mix of above 3
Regional aircraft Operator Controls/Indicators
automatic/manual (system on/off)
bridge engage aircraft
bridge disengage aircraft
system status indicator
Maintenance Controls/Indicators One object is to retrofit existing bridges or alternatively include with OEM's an imaging system to automatically initiate and guide a bridge from a stowed position to dock with an aircraft when parked.

Figure 23:
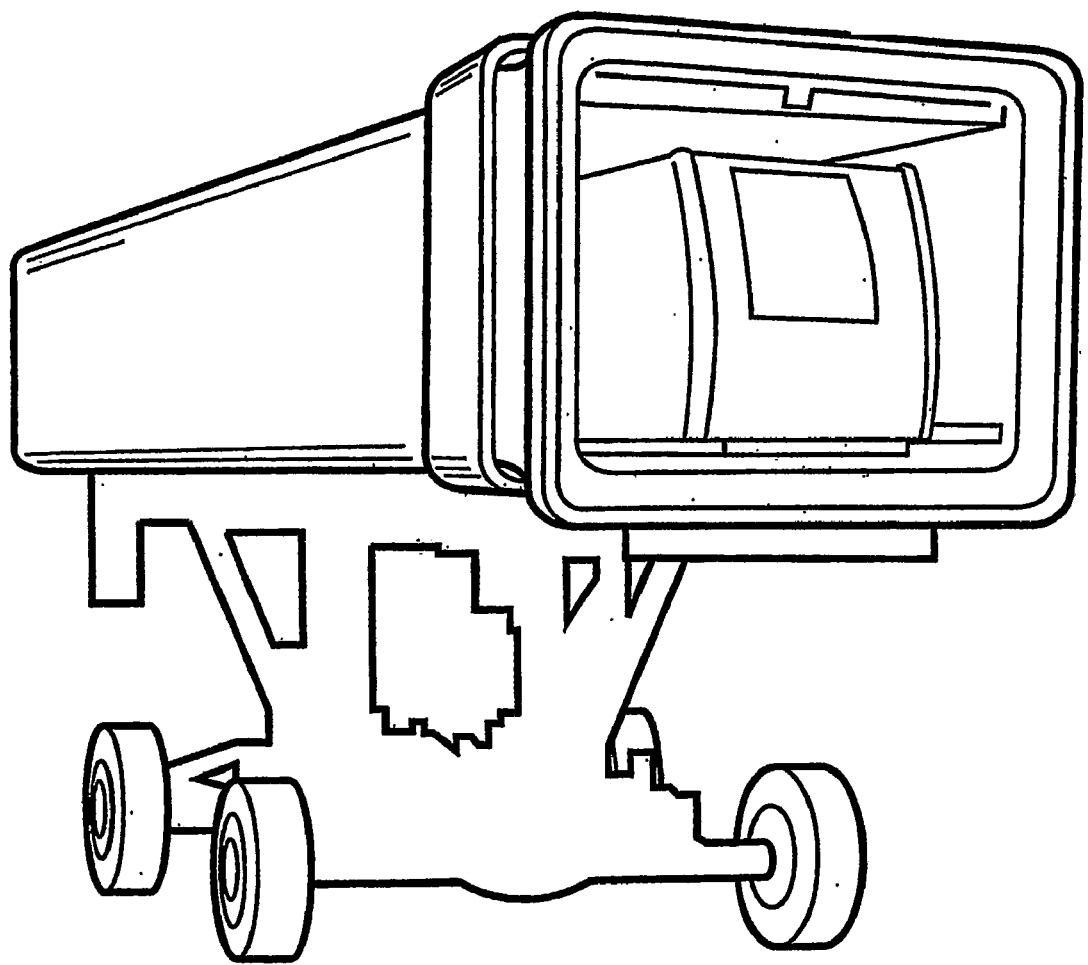
FIGS. 23 to 25 illustrate alternative vehicles which may be utilized with this invention.
Figure 24:
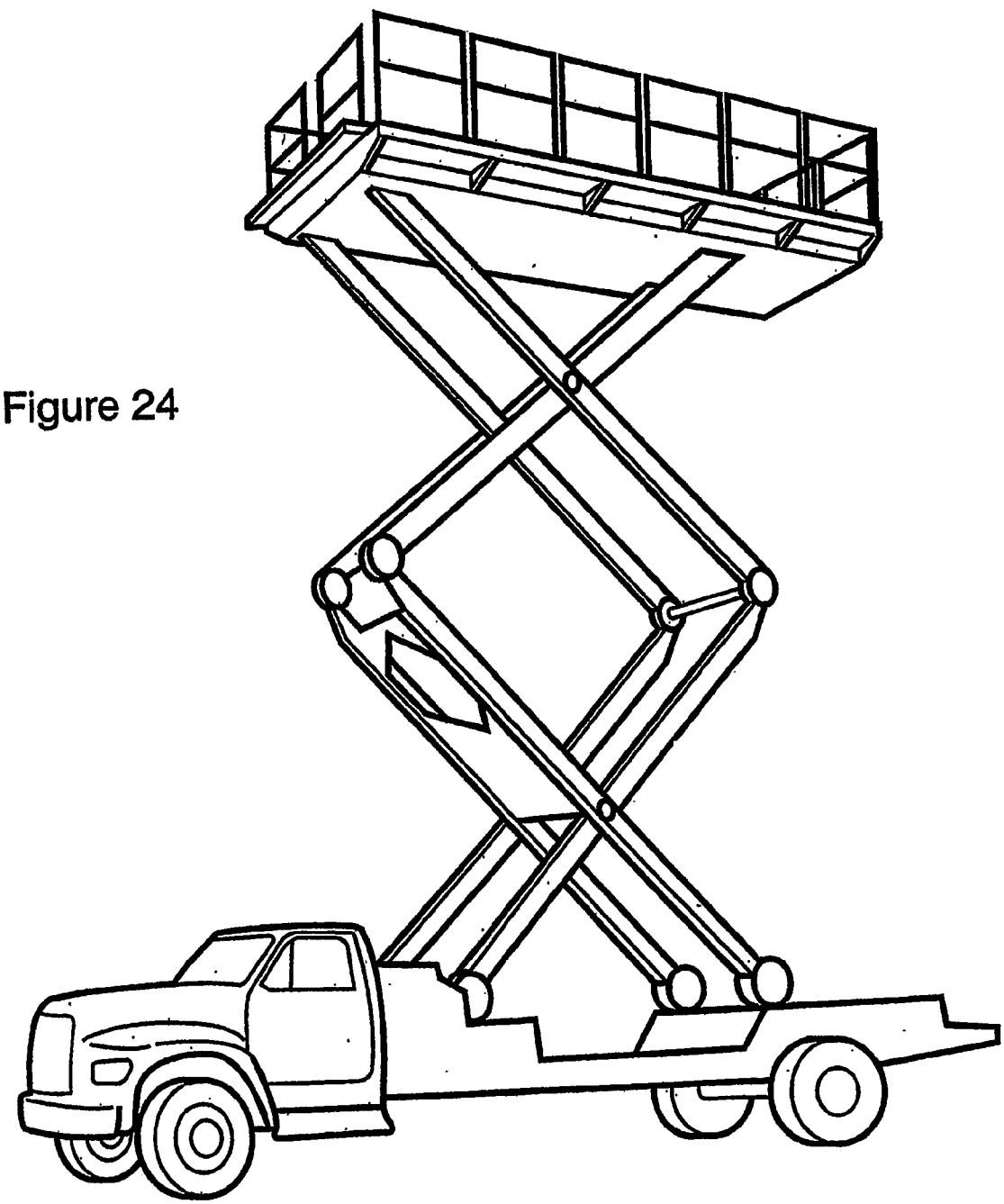
Figure 24:
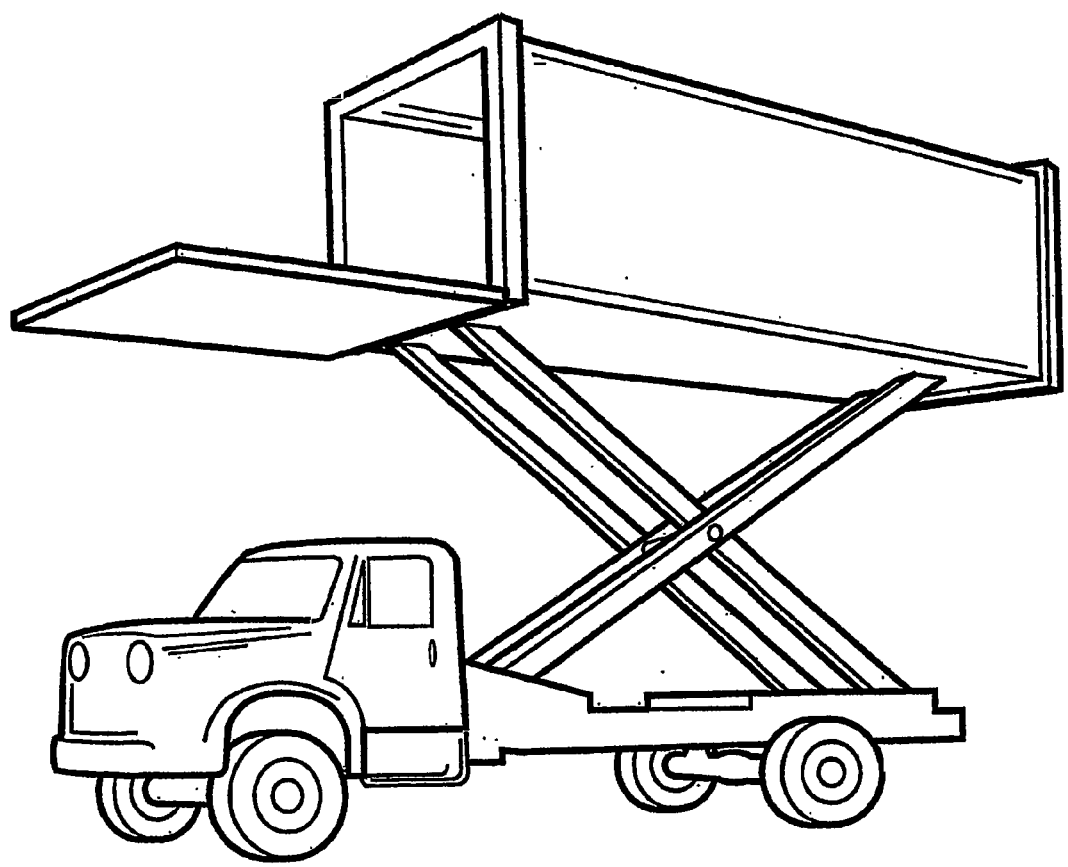
Figure 25:
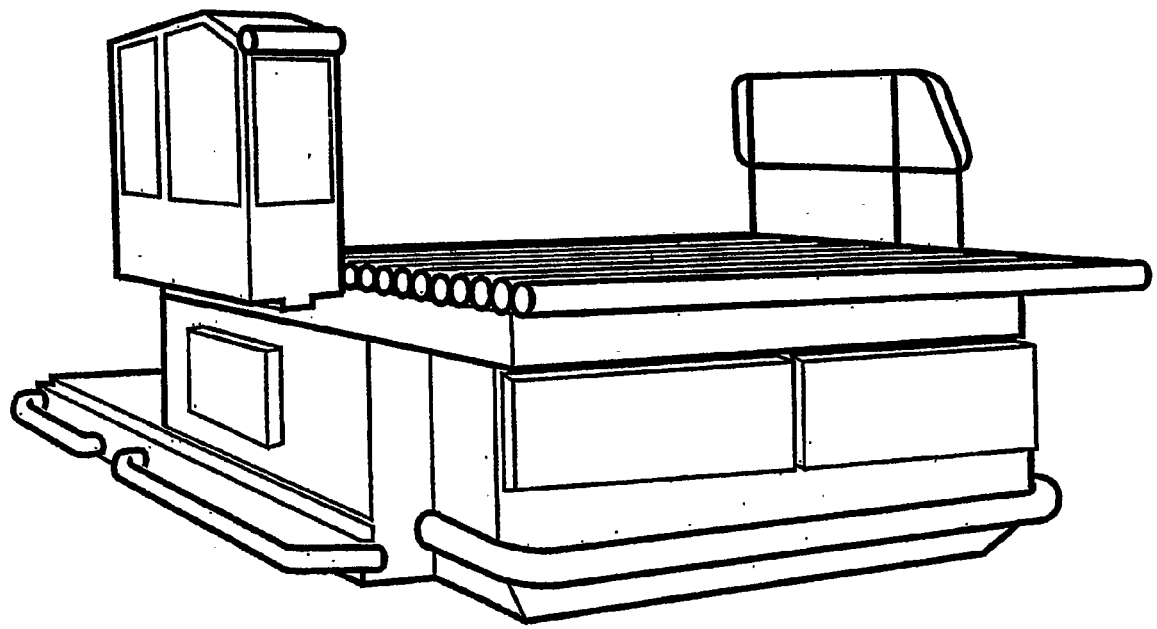

Other Vehicles that could utilize the invention for "docking" with an aircraft are self-propelled cargo loaders, catering/cabin service trucks and passenger transfer vehicles as seen in FIGS. 23 through 25. Each of these vehicles must also be precisely maneuvered into position, elevated to the correct height, and then make gentle contact with the aircraft. In all three cases the illustrated vehicles would also have a camera, a light and a computer mounted on them in a similar manner as described in relation to the passenger bridge embodiment. All vehicles would include sensing and actuating devices similar to the ones used on the passenger bridge. There will be no need for an obstacle detection device or the position determinator function since an operator will move the vehicle into initial position. The software resident in the computer otherwise would be very similar to that used for the passenger bridge. The targets and target acquisition algorithms would be almost identical, however the software would be tailored to drive the appropriate vehicle.

An example of a Cargo Loader as seen in FIG. 25 is Manufactured by FMC Airline Equipment as found on their internet Web site (www.fmcairline.com). FMC make several sizes of these cargo loaders for different capacity loads. The loaders consist of two platforms that can be raised and lowered. The vehicle is positioned so that one platform is adjacent to and level with the cargo floor. The other platform is used to receive cargo at ground level, elevate it to the height of the first platform and transfer it to that platform. The initial approach and docking with the cargo hold could be automated by using an embodiment of the invention. This would minimize the training required for the operator since the final docking would be performed under computer control. To accommodate differences in the location of the targets for a cargo hold door compared to the targets for passenger door the soft ware would be modified to recognize the cargo door pattern.

An example of a Catering/Cabin Service Truck may be as Manufactured by the Stinar Corporation as found at their internet Web site (www.stinar.com) or Manufactured by the Global Ground Support Company as found at their internet Web site (www.global-llc.com) These two manufacturers make similar vehicles as seen in FIG. 24 and FIG. 24A, which can be used to supply the galley of the aircraft with food and beverages and remove waste associated with food service. Alternatively the vehicles can be used to transport cabin service crew and their tools to the aircraft and also to remove garbage and waste from the aircraft after cleaning. The vehicle consists of a conventional truck chassis with a scissor lift. A van body is attached to the scissor lift so that it can be raised from the truck bed to the height of a cabin door. Since the provision of food and beverages is done on wheeled carts the location and height must be precise. The initial approach and docking with the passenger door could be automated by using an embodiment of invention described above.

An example of a Passenger Transfer Vehicle may be as Manufactured by Accessair Systems Inc. as found at their Web site (www.accessairsystems.com). This vehicle as shown in FIG. 23 is similar to a bus in that it carries passengers from the terminal to the aircraft. However unlike a bus where the passengers have to exit and climb stairs to board the aircraft, the body of the vehicle elevates to the same level as the aircraft passenger door so the passengers can board with out using stairs. The initial approach and docking with the passenger door could be automated by using the invention. This automation would permit the PTV to be operated by a less skilled person.

Figure 5:
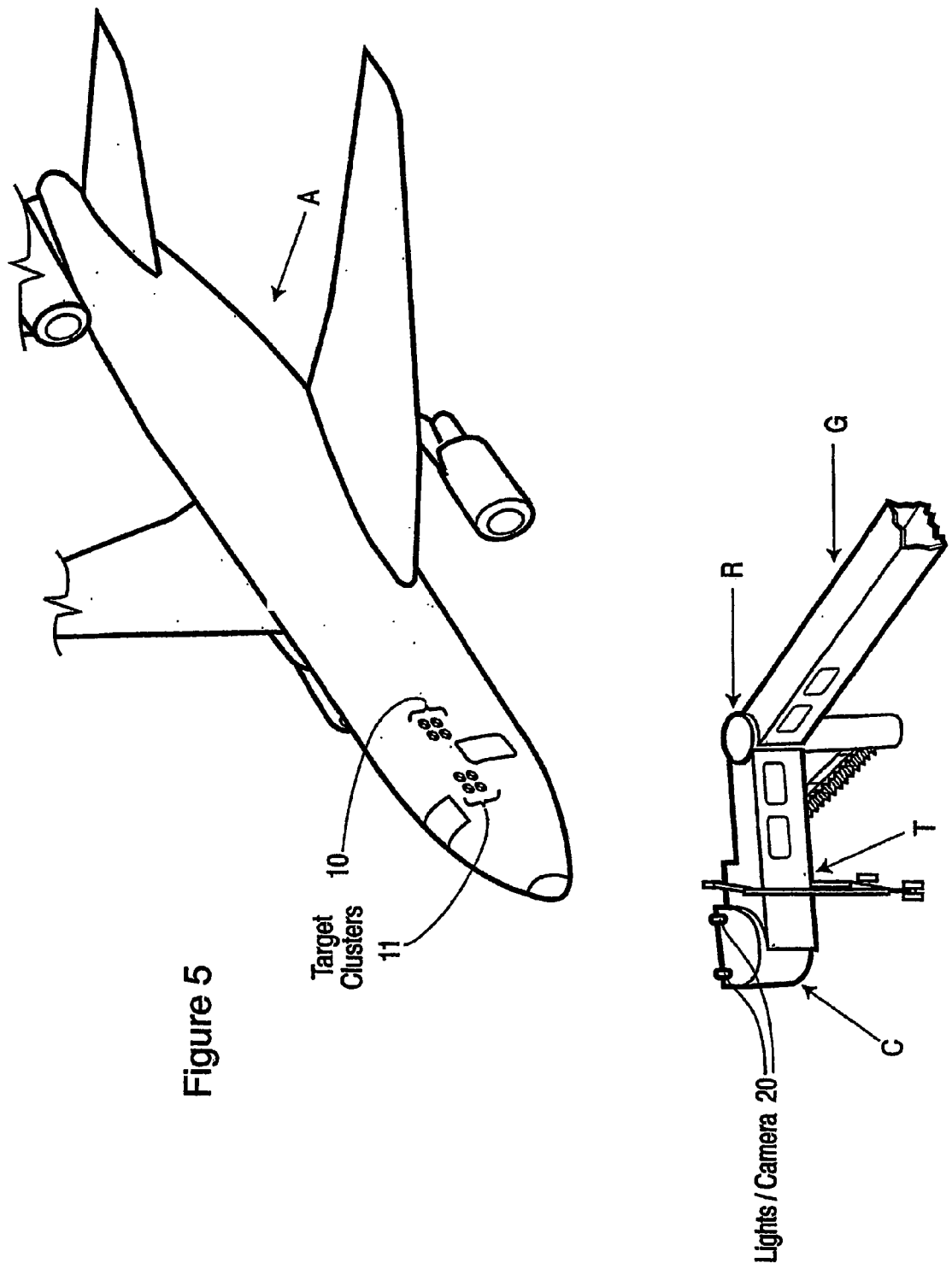

In review therefore, as seen in FIG. 4 as the aircraft A arrives at gate G the passenger bridge B is disposed at the position indicated with the rotunda R being attached to the gate or terminal G and the tunnel T extending there from to cabin C at the terminus thereof. Aircraft A therefore arrives at the parked location P. As seen in FIG. 5 the target dusters 10 and 11 are located proximate the door opening. As seen in FIG. 6 the lights housed with the digital camera 20 shine a cone of light on the targets 10 and 11 when the airplane A is substantially parked the camera and light are disposed in a common housing 20 on cabin C. Based on the orientation of the targets as seen by the computer referring to FIGS.

Figure 12:
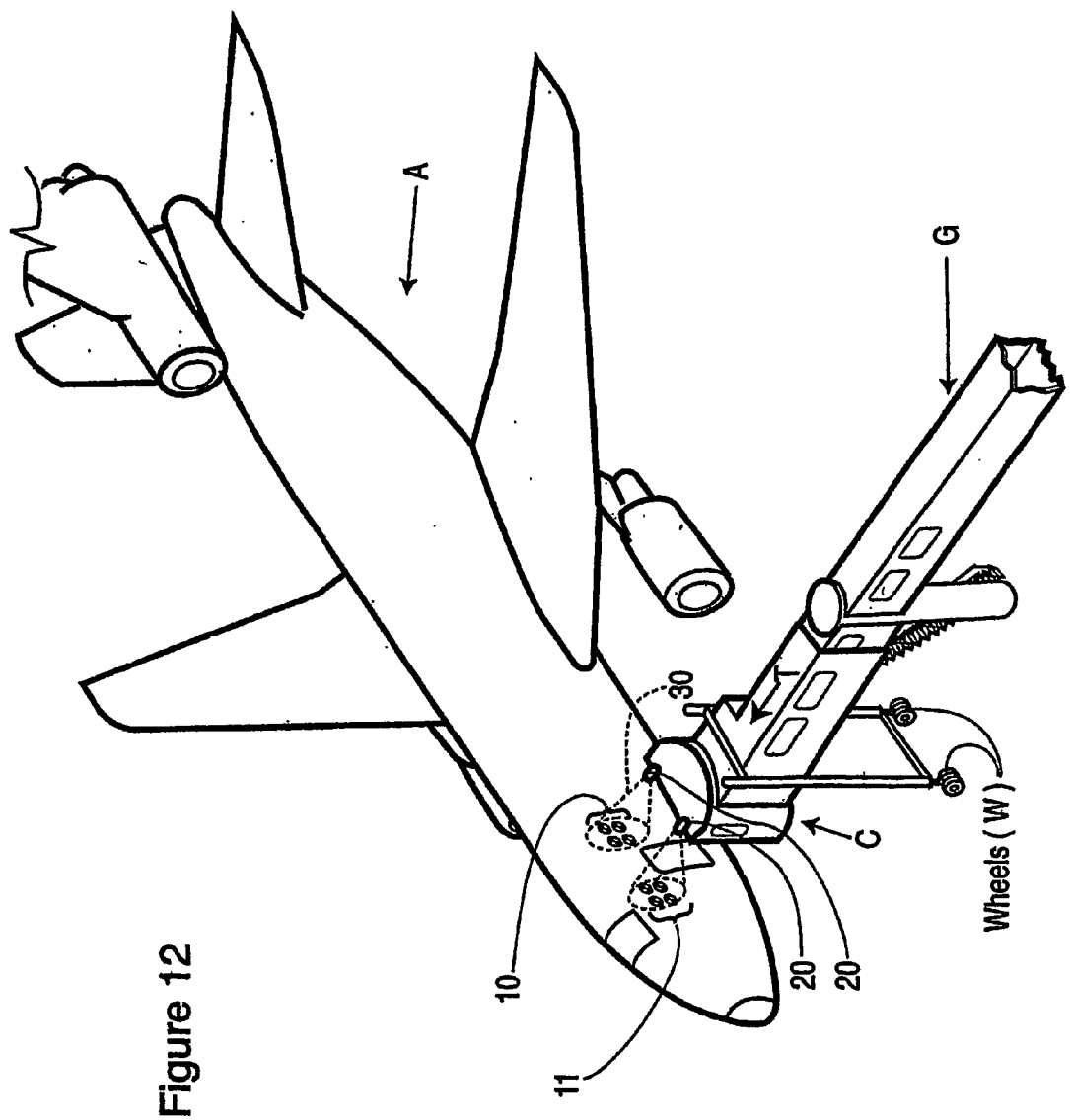
Figure 13:
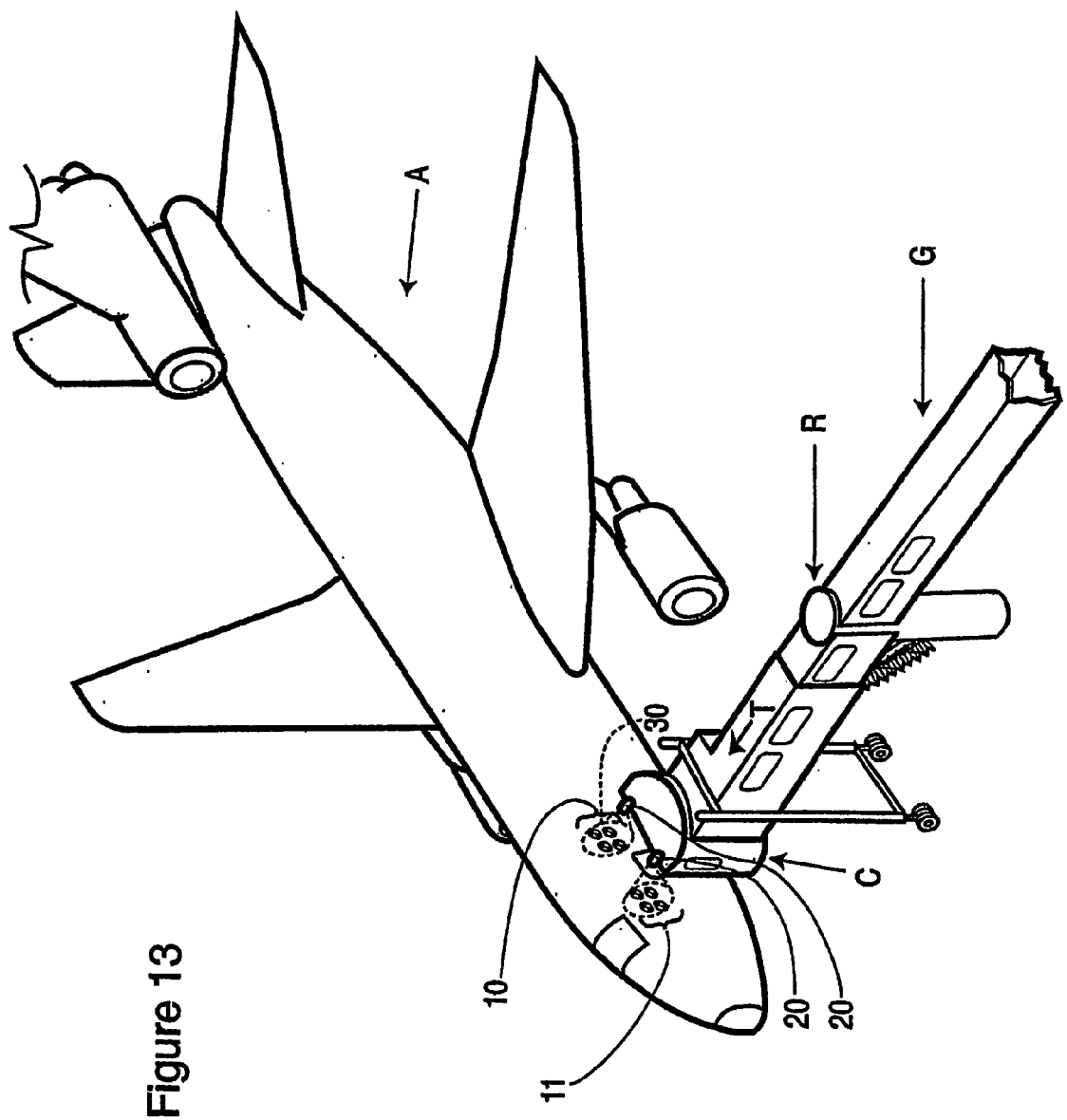
Figure 14:
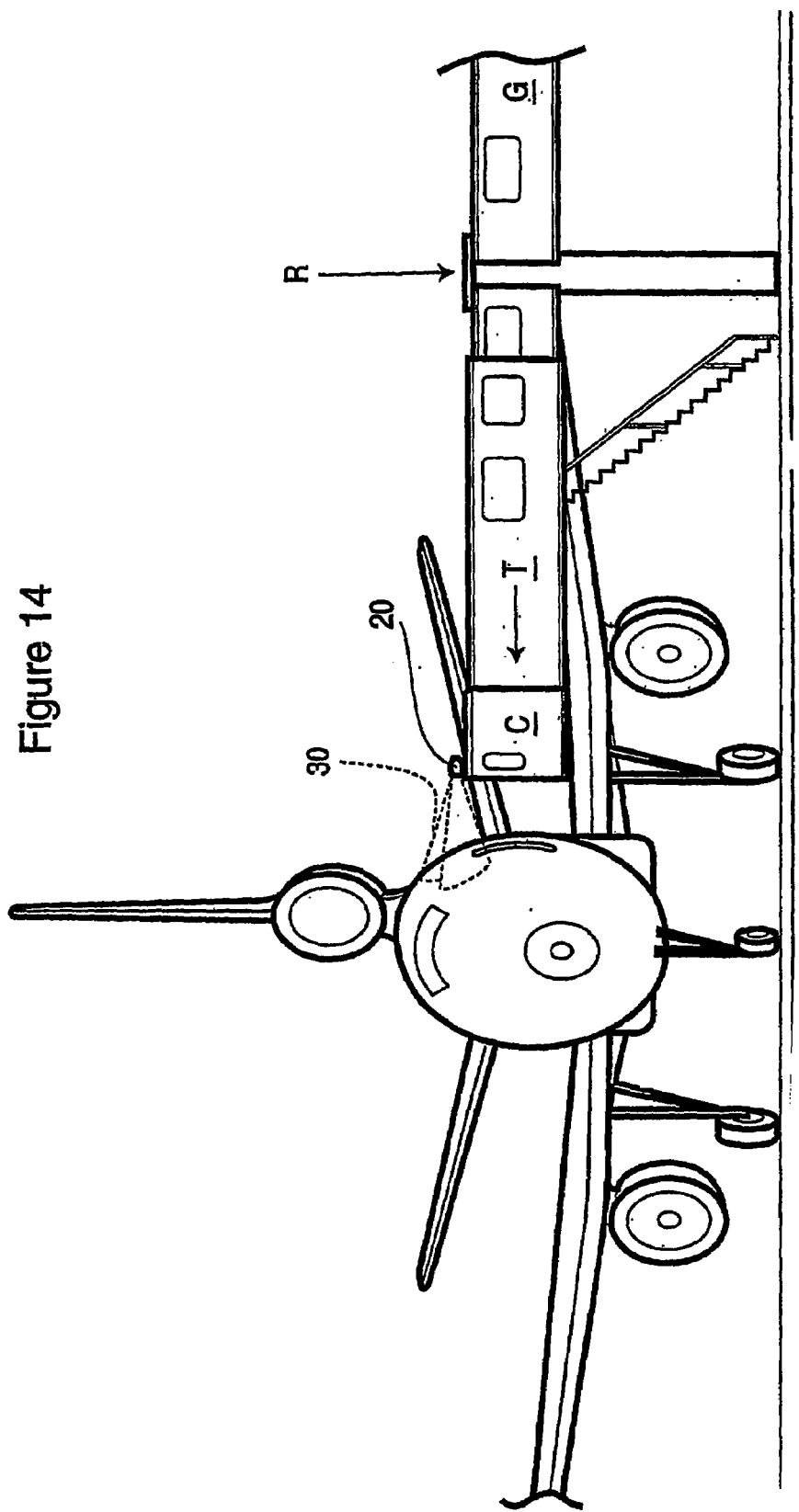

19–22 the computer will be able to determine the position of the passenger bridge and the cabin relative to the door opening. This was described above. The light will therefore continue to be focused on the cluster of targets 10 and 11 and the tunnel T will rotate with respect to the aircraft A while the camera 20 housed with the lights 30 continues to provide images to the computer and until such time as the wheels W reach a position were in the tunnel is fully pivoted as seen in FIG. 12 wherein the tunnel will extend toward the aircraft A while the images continue to be fed to the computer of the cluster 10 and 11 and now with the clusters appearing as in FIG. 19 the tunnel will extend towards the aircraft as seen in FIG. 14 and dock therewith as seen in FIG. 15.

While the foregoing provides a detailed description of the preferred and alternative embodiments of the invention, it is to be understood that this description is illustrative only of the principles of the invention and not limitative. Furthermore, as many changes can be made to the invention without departing from the scope of the invention, it is intended that all material contained herein be interpreted as illustrative of the invention and not in a limiting sense.

The embodiments of the invention in which an exclusive property or privilege is claimed are as follows:

1. An imaging system for identifying the location of an aircraft opening or door and for docking a passenger, cargo, or service vehicle with said aircraft, said system comprising;
   i) a passive target means, including at least one distinctive retro-reflective target, which can be reliably identified, located at the extremities of the opening or door;
   ii) a target identification means including at least one camera having a field of view including said at least one retro-reflective target of the aircraft and to cooperate with lighting means;
   iii) lighting means cooperating with said target identification means, for lighting said at least one retro-reflective target and providing for identification thereof by computer means in communication with said target identification means;
   iv) computer means to process an image of the at least one retro-reflective target from the target identification means and to enhance said image to uniquely identify said at least one distinctive retro-reflective target;
   v) software means resident in said computer means to provide the instructions set and logic for said system to compare processed information including the enhanced image with stored information, and to thereby determine the relevant orientation, distance, and trajectories of the vehicle to be automatically docked with said aircraft based on the system's determination only.

2. An automatic computerized passenger boarding bridge control system, said bridge having passenger bridge locomotion means to allow the bridge to move in relation to the aircraft, said system for use in conjunction with departing/arriving aircraft at an airport and comprising:
   i) passive retro-reflective target means for identifying an exit/entrance doorway irrespective of each aircraft type;
   ii) target identification means, preferably at least one camera, to identify when the aircraft containing the retro-reflective target means is proximate a parking location adjacent a predetermined gate for the passenger boarding bridge;
   iii) position detection means for determining the physical location of the passenger boarding bridge, including the angle of the wheels relative to the telescopic tunnel, angle of the vestibule relative to the tunnel, and the radius of curvature based upon gallery extension relative to the pivot point on the terminal, to permit the computer to calculate the trajectory of the passenger loading bridge and then instruct passenger bridge locomotion means over the required path;
   iv) computing means in communication with said target identification means, said position detection means, and said passenger bridge locomotion means, to activate said locomotion means and to provide instruction to said bridge as to when and how to move based on input from said target identification means, and said position detection means, to receive and process all input system signals and provide output system signals to said passenger bridge locomotion means, to stop, move, elevate or lower, pause, or steer in a predetermined direction, to turn on and synchronize the cameras and lights as necessary; and initiate any warning lights, buzzer, horn or audible signals;
   v) lighting means to light the target means when the aircraft is proximate the parked location for the aircraft;
   vi) software means resident in said computing means to provide the instruction set and logic required to operate said system, to compare processed information including the enhanced image with stored information, and to thereby determine the relevant orientation, distance, and trajectories of the vehicle to be automatically docked with said aircraft based on the system's determination only;
wherein said system allows for the movement of a passenger boarding bridge during the departure and/or arrival of an aircraft without need for an operator thereof.

3. The system of claim 1 wherein said system is installed with a vehicle selected from the group of equipment of:
   i) cargo hauling equipment;
   ii) passenger facilities equipment; and
   iii) a passenger boarding bridge.

4. The system of claim 1, 3, or 2 wherein the target identification means is at least one digital camera.

5. The system of claim 1, 3, or 2 wherein the retro-reflective target is made from retro-reflective material such as manufactured by the 3M Company known as SCOTCHLITE®.

6. A computerized automatic passenger boarding bridge control system, said bridge having a passenger bridge locomotor to allow the bridge to move in relation to the aircraft, said system for use in conjunction with departing/arriving aircraft at an airport and comprising:
   i) at least one passive retro-reflective target for identifying an exit/entrance doorway irrespective of each aircraft type;
   ii) at least one camera, to identify when the aircraft containing the at least one retro-reflective target is proximate a parking location adjacent a predetermined gate for the passenger boarding bridge;
   iii) a position detector for determining the physical location of the passenger boarding bridge, including the angle of the wheels relative to the telescopic tunnel, and angle of the vestibule relative to the tunnel, to permit the computer to calculate the trajectory of the passenger loading bridge and then instruct said locomotor over the required path;
   iv) a computer in communication with said target identifier, said position detector, and said passenger bridge locomotor, to activate said locomotor and to provide instruction to said bridge as to when and how to move based on input from said at least one camera, and said position detector, to receive and process all input system signals and provide output system signals to said passenger bridge locomotor, to stop, move, elevate or lower, pause, or steer in a predetermined direction, to turn on and synchronize the cameras and lights as necessary; and initiate any warning lights, buzzer, horn or audible signals;

v) an obstacle recognizer to inform said computer that an obstacle is present preventing further motion of said bridge and indicating the need for action by personnel to remove said obstacle;

vi) lighting to light the at least one retro-reflective target when the aircraft is proximate the parked location for the aircraft; vii) software resident in said computer to provide the instruction set and logic required to operate said system, to compare processed information including the enhanced image with stored information, and to thereby determine the relevant orientation, distance, and trajectories of the vehicle to be automatically docked with said aircraft based on the system's determination only;

wherein said system allows for the movement of a passenger boarding bridge during the departure and/or arrival of an aircraft without need for an operator thereof.

7. An automatic imaging system for, initiating, the controlling, positioning and docking of a vehicle with the opening of an aircraft without being informed of the aircraft type, said vehicle having locomotion means to move and raise/lower said vehicle, said system comprising a cluster of definitive, retro-reflective, targets located adjacent the opening of the aircraft in a recognizable manner, lighting means to focus on said retro-reflective targets when the aircraft is located at least adjacent to an expected position, at least one camera, disposed substantially adjacent said lighting means and with a field of view directed parallel to light emanating from said lighting means so as to capture any reflected images of said retro-reflective targets and to generate enhanced images thereof to communicate to a computer, and having a field of view including said retro-reflective targets in cooperation with the lighting means;

a computer disposed with said vehicle to process said images received from said at least one camera and to provide actuating signals to said locomotion means of said vehicles, software resident in said computer to provide an instruction set to said computer as to how to process said image information and what actions to commence in view of the information, wherein said imaging system automatically scans the area whereat said vehicle is expected and, once the retro-reflective targets are acquired as verified by the computer, initiates and controls the positioning and docking of the vehicle with the aircraft opening while maintaining constant observation of said retro-reflective targets.

8. The system of claim 7 wherein said imaging system is installed with a vehicle selected from the group of equipment of:
  i) cargo hauling equipment;
  ii) passenger facilities equipment; and
  iii) a passenger boarding bridge.

9. The system of claim 1, 2, 6 or 7 wherein said at least one camera further comprises at least one primary camera and at least one broad-view camera.

10. The system of claim 1, 2, 6 or 7 wherein said at least one camera further comprises a zoom lens.

11. The system of claim 9 wherein said at least one primary camera or said at least one broad-view camera further comprises a zoom lens.

12. The system of claim 1, 2, 6 or 7 wherein said at least one camera further comprises a pan- or pan-and-tilt mount.

13. The system of claim 1, 2, 6 or 7 further comprising lighting means which are synchronized with said at least one cameras to pulsate co-operatively therewith thus providing the computer means with definitive images.

14. The system of claim 13 wherein said lighting means further comprises monochromatic light.

15. The system of claim 1, 2, 6 or 7 wherein said retro-reflective target means further comprises a cluster of targets.

16. The system of claim 1, 2, 6 or 7 further comprising two cameras synchronized with two lighting means which pulsate alternatively thus providing the computer means with images which may be subtracted from one another to provide an enhanced image.

17. A kit of components comprising the system of claims 1, 2, 6 or 7 to be retrofitted with an existing vehicle selected from the group of equipment of:
  i) cargo hauling equipment;
  ii) passenger facilities equipment; and
  iii) a passenger boarding bridge.

18. A method of identifying the position of an opening, of an aircraft, said opening having a predetermined perimeter; said method comprising
  i) providing at least one retro-reflective target means proximate the perimeter of said opening,
  ii) directing lighting means on said at least one retro-reflective target means;
  iii) providing a target identification means cooperating with said lighting means to provide images of said at least one retro-reflective target means to a computing means;
  iv) computing means for receiving information from said target identification means to process said information and thereby determine further action which might be taken based on the identification of the position of the opening.

19. The method of claim 18 wherein said opening is selected from the group of openings including a passenger door, or a cargo door.

20. The method of claim 18 wherein a passenger bridge, or cargo handling equipment is controlled by said computing means based on identification of said at least one retro-reflective target means, allowing for the docking of said passenger bridge or cargo handling equipment with said aircraft to facilitate loading and unloading upon arrival of the aircraft at a parked location and the separation thereof when the loading and unloading of the aircraft is completed prior to the departure of the aircraft from the parked location.

21. The method of claim 18 wherein said at least one camera further comprises at least one primary camera and at least one broad-view camera.

22. The method of claim 18 wherein said at least one camera further comprises a zoom lens.

23. The method of claim 21 wherein said at least one primary camera or said at least one broad-view camera further comprises a zoom lens.

24. The method of claim 18 wherein said at least one camera further comprises a pan or pan-and-tilt mount.

* * * * *